United States Patent
Kim et al.

(10) Patent No.: US 8,797,390 B2
(45) Date of Patent: Aug. 5, 2014

(54) IMAGE DISPLAY DEVICE, 3D VIEWING DEVICE, AND METHOD FOR OPERATING THE SAME

(75) Inventors: Daehun Kim, Seoul (KR); Seonghak Moon, Seoul (KR); Junhak Lee, Seoul (KR); Joongmin Ra, Seoul (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 13/028,377

(22) Filed: Feb. 16, 2011

(65) Prior Publication Data

US 2011/0199466 A1    Aug. 18, 2011

Related U.S. Application Data

(60) Provisional application No. 61/305,144, filed on Feb. 17, 2010.

(51) Int. Cl.
*H04N 13/04* (2006.01)

(52) U.S. Cl.
USPC .......... 348/55; 348/53; 348/54; 348/56; 455/41.2; 455/41.3; 345/419

(58) Field of Classification Search
USPC ........ 348/54, 55, 56, 53; 455/41.2, 41.3; 345/419
See application file for complete search history.

(56) References Cited

U.S. PATENT DOCUMENTS

| | | | |
|---|---|---|---|
| 4,286,286 A | 8/1981 | Jurisson et al. | |
| 5,710,592 A | 1/1998 | Oh | |
| 5,821,989 A * | 10/1998 | Lazzaro et al. | 348/56 |
| 6,215,590 B1 * | 4/2001 | Okano | 359/464 |
| 6,791,599 B1 * | 9/2004 | Okada et al. | 348/56 |
| 2010/0007582 A1 | 1/2010 | Zalewski et al. | |
| 2010/0157031 A1 * | 6/2010 | MacNaughton et al. | 348/56 |
| 2010/0207954 A1 * | 8/2010 | Kim | 345/589 |
| 2010/0259603 A1 * | 10/2010 | Mihara et al. | 348/53 |
| 2011/0001808 A1 * | 1/2011 | Mentz et al. | 348/59 |
| 2011/0050866 A1 * | 3/2011 | Yoo | 348/53 |
| 2011/0159813 A1 * | 6/2011 | Mallinson et al. | 455/41.2 |
| 2011/0181708 A1 * | 7/2011 | Yoon et al. | 348/56 |
| 2011/0242275 A1 * | 10/2011 | MacNaughton et al. | 348/42 |

FOREIGN PATENT DOCUMENTS

JP    H11-075223 A    3/1999

OTHER PUBLICATIONS

European Search Report for Application 11001307.5 dated Mar. 15, 2013.
European Search Report dated Jul. 24, 2013 for corresponding European Application No. 11001307.5.

* cited by examiner

*Primary Examiner* — Christopher S Kelley
*Assistant Examiner* — Zhihan Zhou
(74) *Attorney, Agent, or Firm* — KED & Associates LLP

(57) ABSTRACT

An image display device, a 3D viewing device, and a method for operating the same are provided. The method includes receiving a synchronization signal from an image display device, alternately opening a left glass and a right glass according to the synchronization signal, and simultaneously opening the left glass and the right glass in a left-eye image display period or a right-eye image display period of a 3D image displayed on the image display device when a period of the synchronization signal has changed. This ensures that a user reliably (or correctly) views 3D or 2D images using the 3D viewing device.

8 Claims, 25 Drawing Sheets

FIG. 4
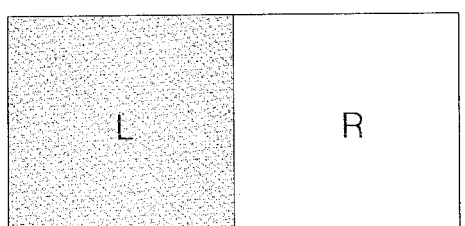
(a)
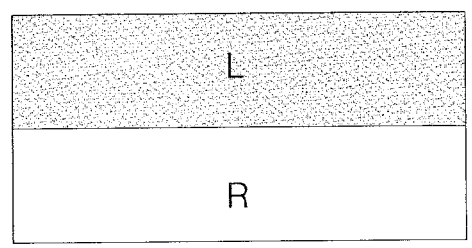
(b)
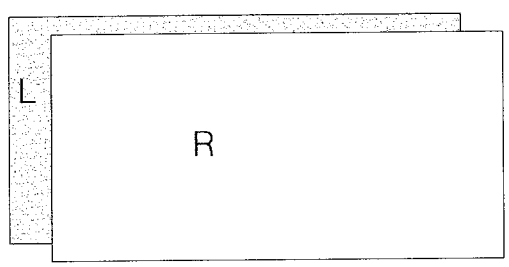
(c)
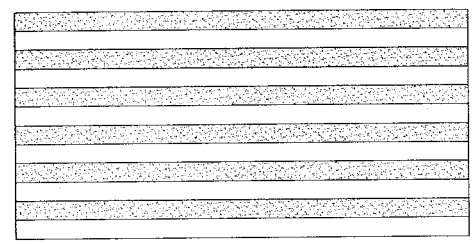
(d)
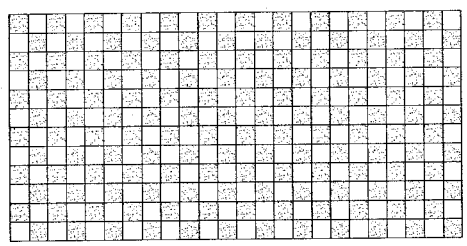
(e)

FIG. 5
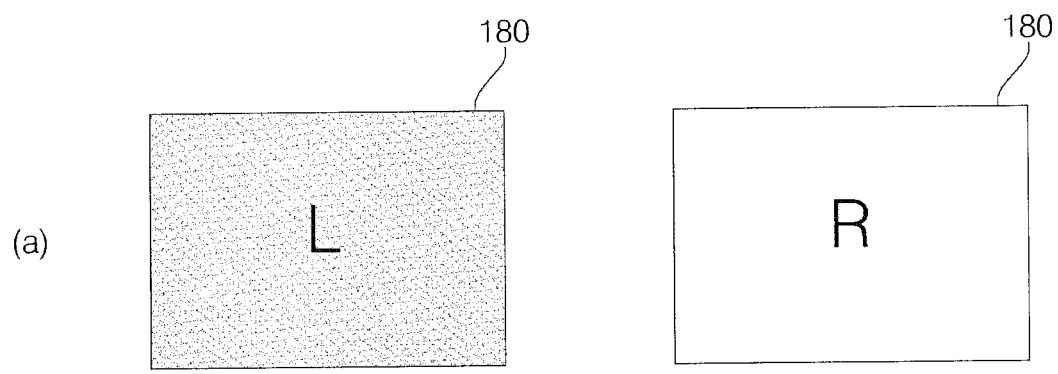
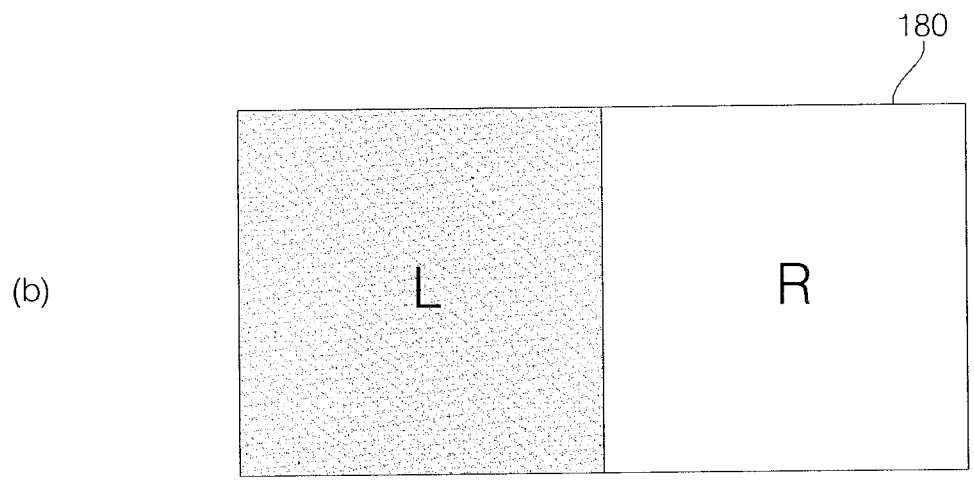
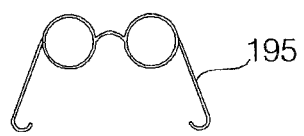

FIG. 6
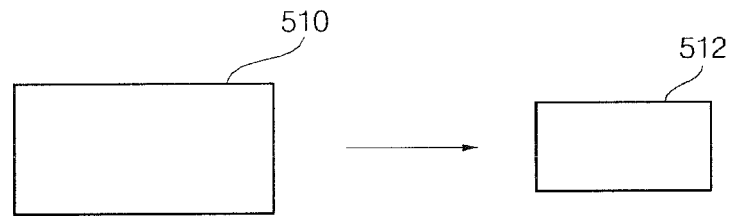
(a)
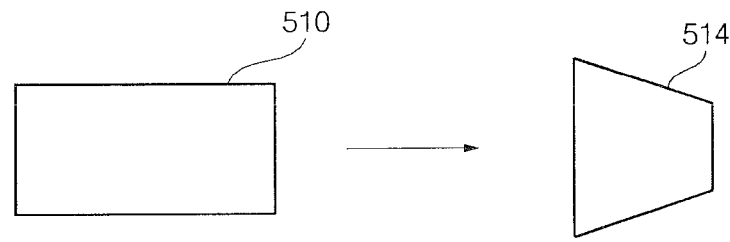
(b)
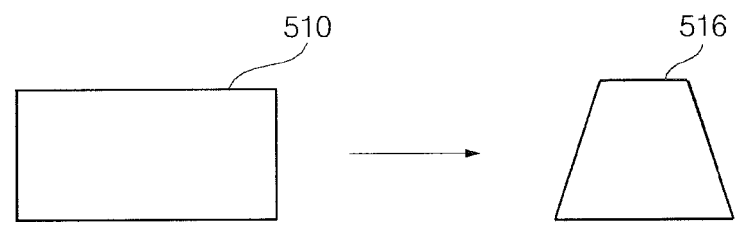
(c)
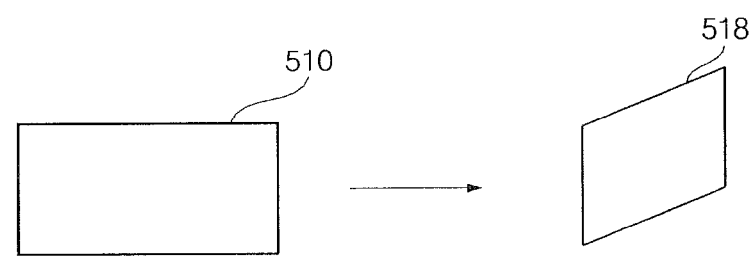
(d)

FIG. 9
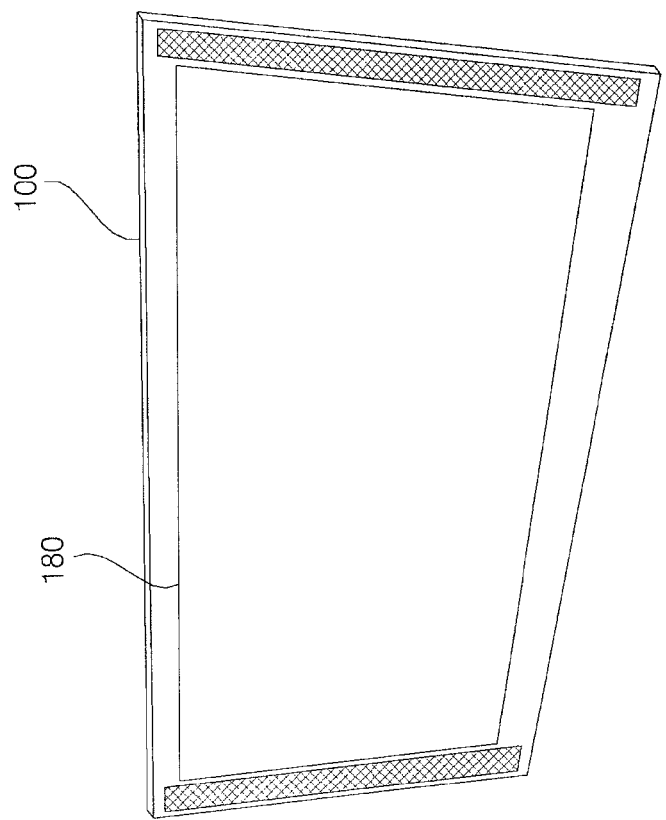
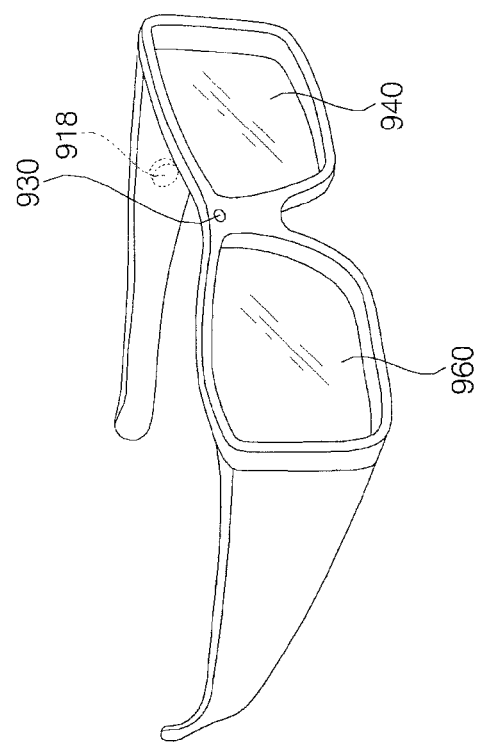

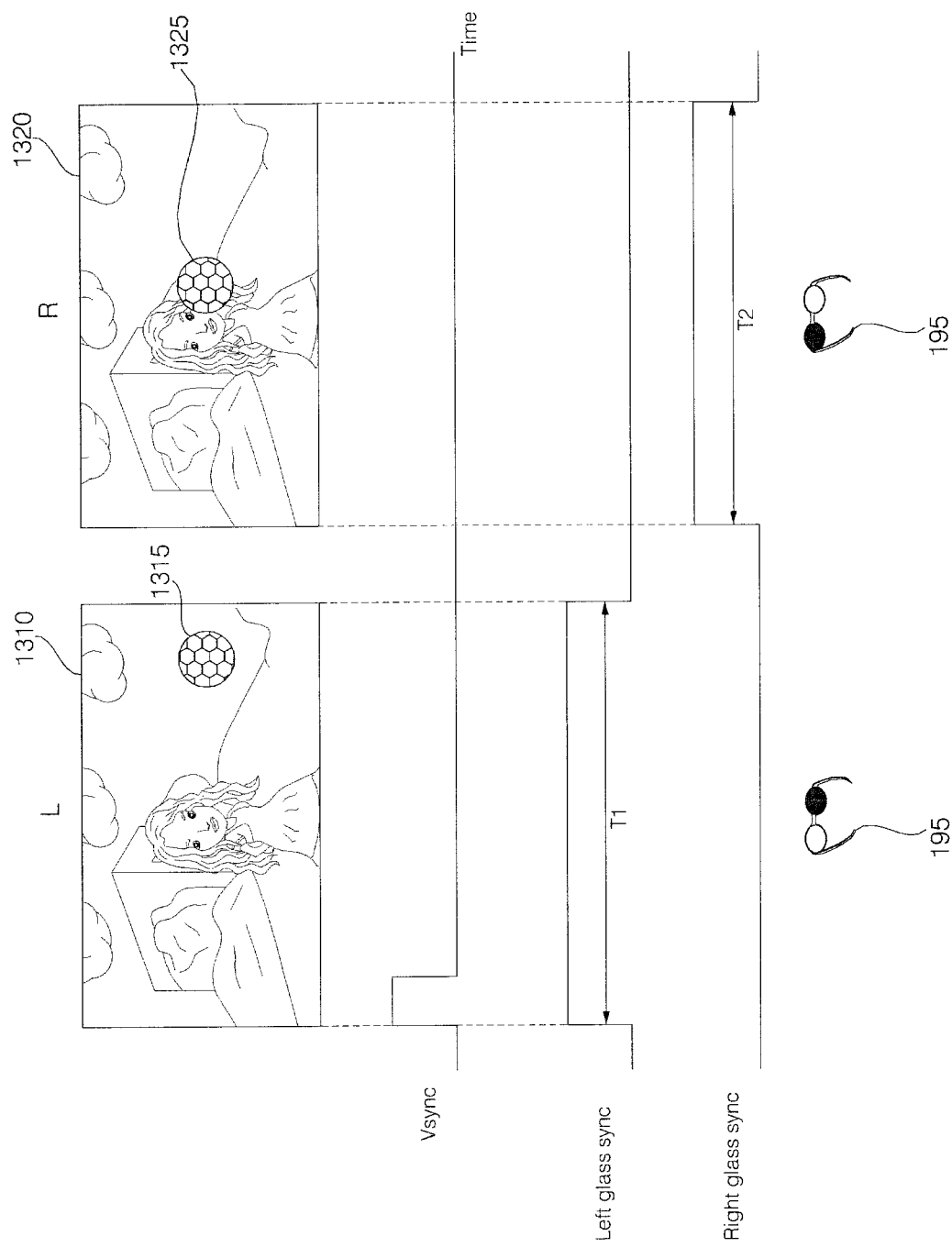

FIG. 14
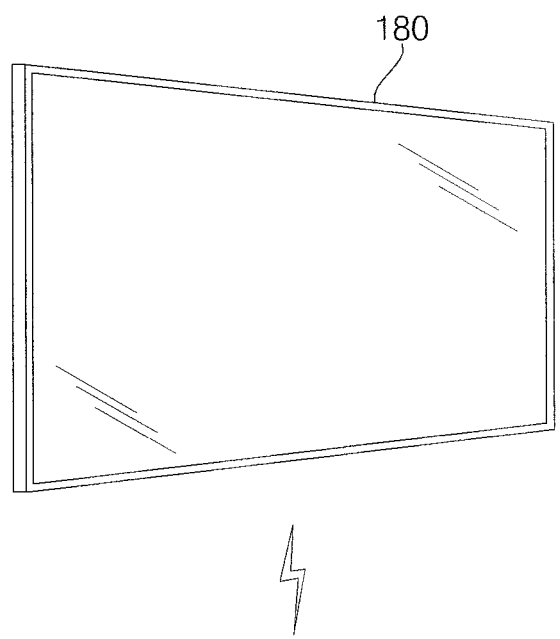
Vsync _____
195

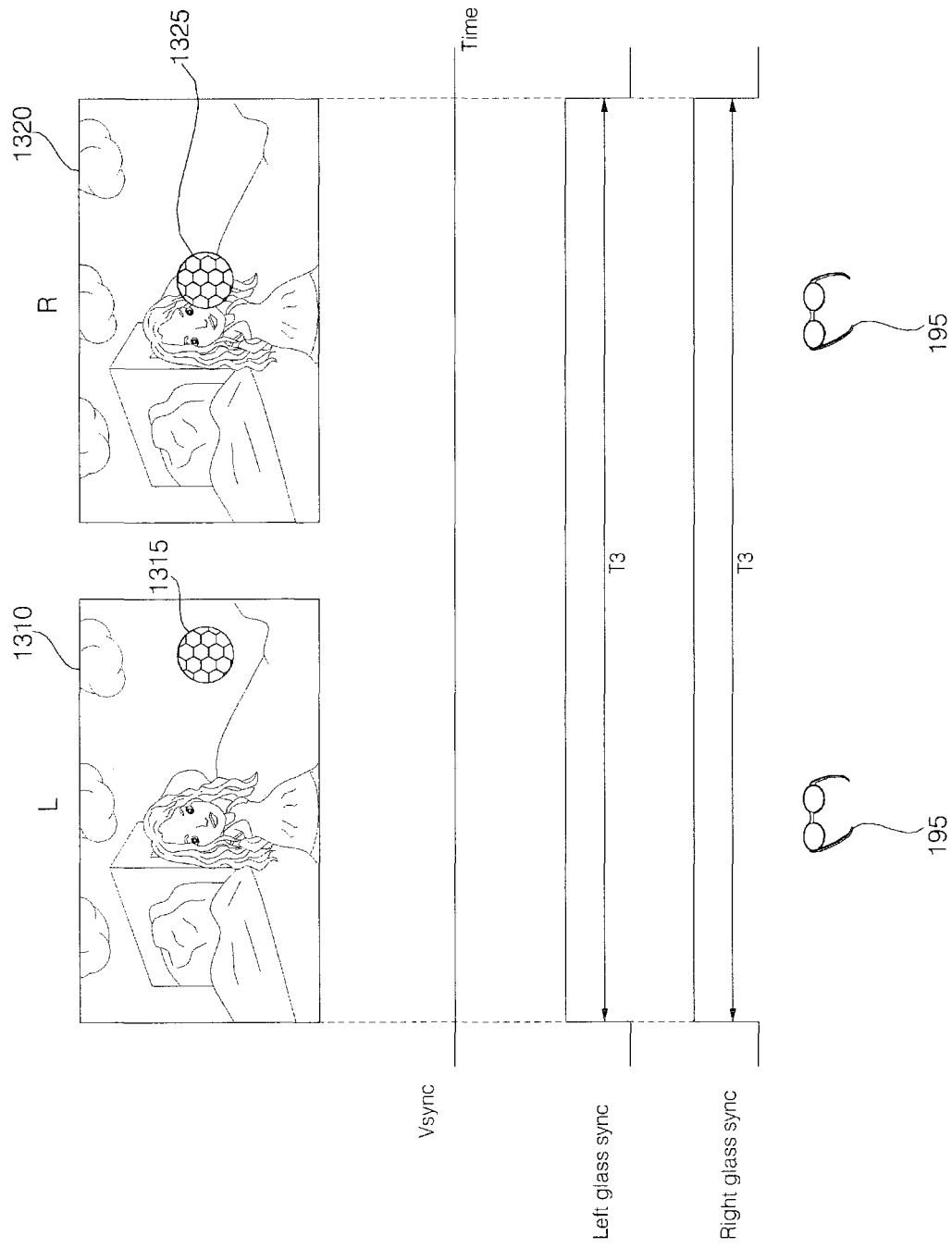

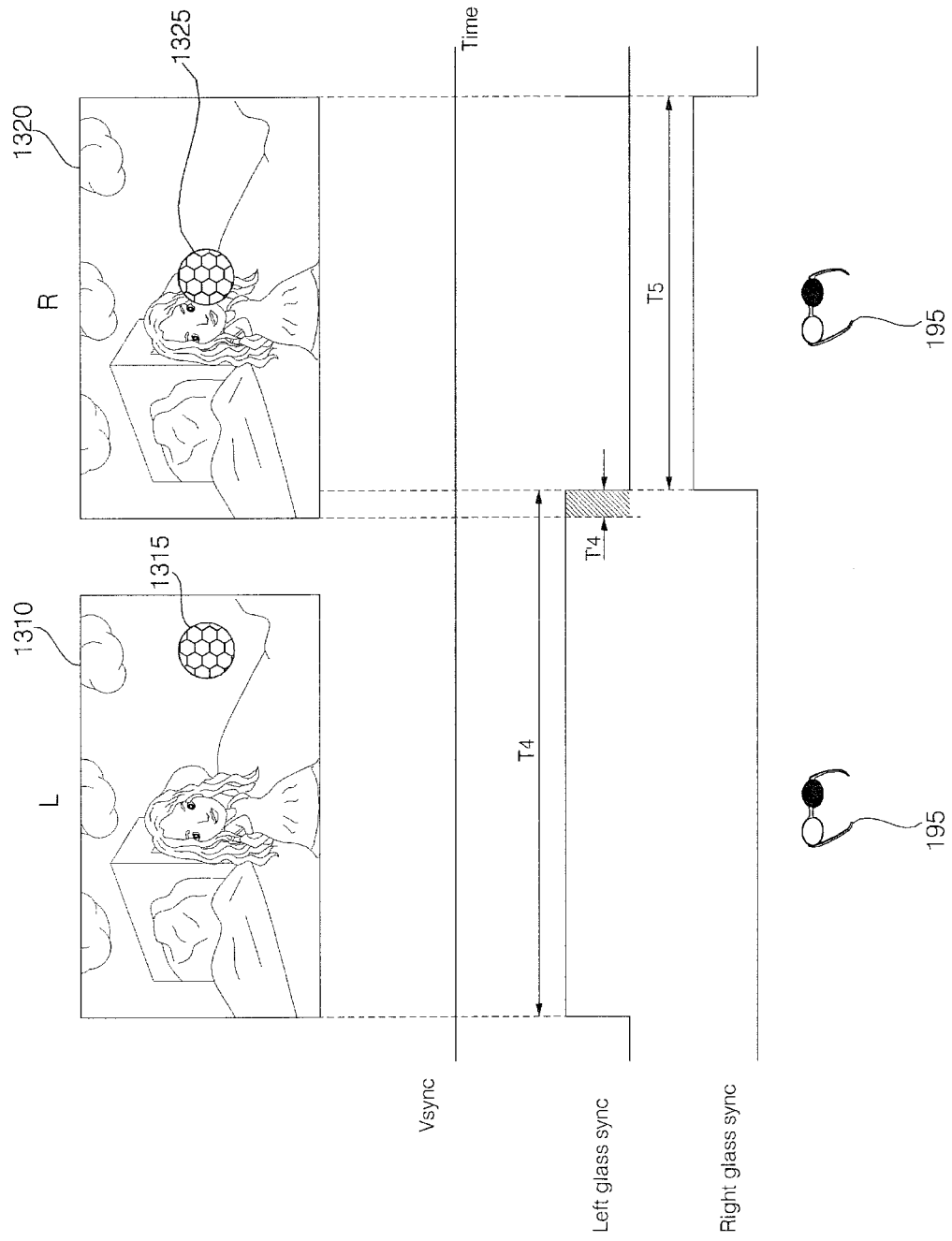

IMAGE DISPLAY DEVICE, 3D VIEWING DEVICE, AND METHOD FOR OPERATING THE SAME

CROSS-REFERENCE TO RELATED APPLICATION

This application claims the benefit of U.S. Provisional Application No. 61/305,144 filed on Feb. 17, 2010 in the USPTO, the disclosure of which is incorporated herein by reference.

BACKGROUND OF THE INVENTION

1. Field of the Invention

The present invention relates to an image display device, a 3D viewing device, and a method for operating the same, and more particularly to an image display device, a 3D viewing device, and a method for operating the same, which enable a user wearing a 3D viewing device to reliably (or correctly) view 3D or 2D images.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services.

Extensive research has recently been conducted on three-dimensional (3D) images. In addition, 3D stereoscopy has been widely used and commercialized in a variety of environments and technologies.

SUMMARY OF THE INVENTION

Therefore, the present invention has been made in view of the above circumstances, and it is an object of the present invention to provide an image display device, a viewing device, and a method for operating the same, which enable a user wearing a 3D viewing device to reliably (or correctly) view 3D or 2D images.

It is another object of the present invention to provide an image display device, a viewing device, and a method for operating the same, which prevent a user wearing a 3D viewing device from viewing a double image.

In accordance with an aspect of the present invention, the above and other objects can be accomplished by the provision of a method for operating a 3D viewing device, the method including receiving a synchronization signal from an image display device, alternately opening a left glass and a right glass according to the synchronization signal, and simultaneously opening the left glass and the right glass in a left-eye image display period or a right-eye image display period of a 3D image displayed on the image display device when a period of the synchronization signal has changed.

In accordance with another aspect of the present invention, the above and other objects can be accomplished by the provision of a method for operating a 3D viewing device, the method including receiving a first synchronization signal from an image display device, alternately opening a left glass and a right glass according to the first synchronization signal, generating, when a period of the first synchronization signal has changed, a second synchronization signal corresponding to a period prior to the change of the period of the first synchronization signal, and alternately opening the left glass and the right glass according to the second synchronization signal.

In accordance with another aspect of the present invention, the above and other objects can be accomplished by the provision of a method for operating an image display device, the method including transmitting a synchronization signal to a 3D viewing device, displaying a 3D image on a display when a normal operation signal is received from the 3D viewing device, and switching the 3D image to a 2D image when an abnormal operation signal is received from the 3D viewing device and displaying the 2D image on the display.

In accordance with another aspect of the present invention, the above and other objects can be accomplished by the provision of a 3D viewing device including a left glass and a right glass, a wireless communication unit to transmit or receive data to or from an image display device, and a controller to perform a control operation for alternately opening the left glass and the right glass according to a synchronization signal received from the image display device through the wireless communication unit and simultaneously opening the left glass and the right glass in a left-eye image display period or a right-eye image display period of a 3D image displayed on the image display device when a period of the synchronization signal has changed.

In accordance with another aspect of the present invention, the above and other objects can be accomplished by the provision of a 3D viewing device including a left glass and a right glass, a wireless communication unit to transmit or receive data to or from an image display device, a controller to perform a control operation for alternately opening the left glass and the right glass according to a first synchronization signal received from the image display device through the wireless communication unit, generating, when a period of the first synchronization signal has changed, a second synchronization signal corresponding to a period prior to the change of the period of the first synchronization signal, and alternately opening the left glass and the right glass according to the second synchronization signal.

In accordance with another aspect of the present invention, the above and other objects can be accomplished by the provision of an image display device including a display for displaying images, a wireless communication unit to transmit or receive data to or from a 3D viewing device, and a controller to perform a control operation for transmitting a synchronization signal to the 3D viewing device, displaying a 3D image on the display when a normal operation signal is received from the 3D viewing device, switching the 3D image to a 2D image when an abnormal operation signal is received from the 3D viewing device, and displaying the 2D image on the display.

BRIEF DESCRIPTION OF THE DRAWINGS

The above and other objects, features and other advantages of the present invention will be more clearly understood from the following detailed description taken in conjunction with the accompanying drawings, in which:

FIG. 4 illustrates various formats of a 3D image;

FIG. 5 illustrates an operation of a 3D viewing device according to a format shown in FIG. 4;

FIG. 6 illustrates various scaling schemes of a 3D image signal according to an embodiment of the present invention;

FIG. 9 illustrates a 3D viewing device and an image display device according to an embodiment of the present invention;

FIGS. 12 to 18 illustrate various examples of the method for operating a 3D viewing device shown in FIG. 11;

DETAILED DESCRIPTION OF THE PREFERRED EMBODIMENTS

Exemplary embodiments of the present invention will be described with reference to the attached drawings.

The word "module" or "unit", which is added to the end of terms describing components, is merely used for ease of explanation of the present invention and has no specific meaning or function with respect to the components. Thus, the words "module" and "unit" may be used interchangeably.

Figure 1:
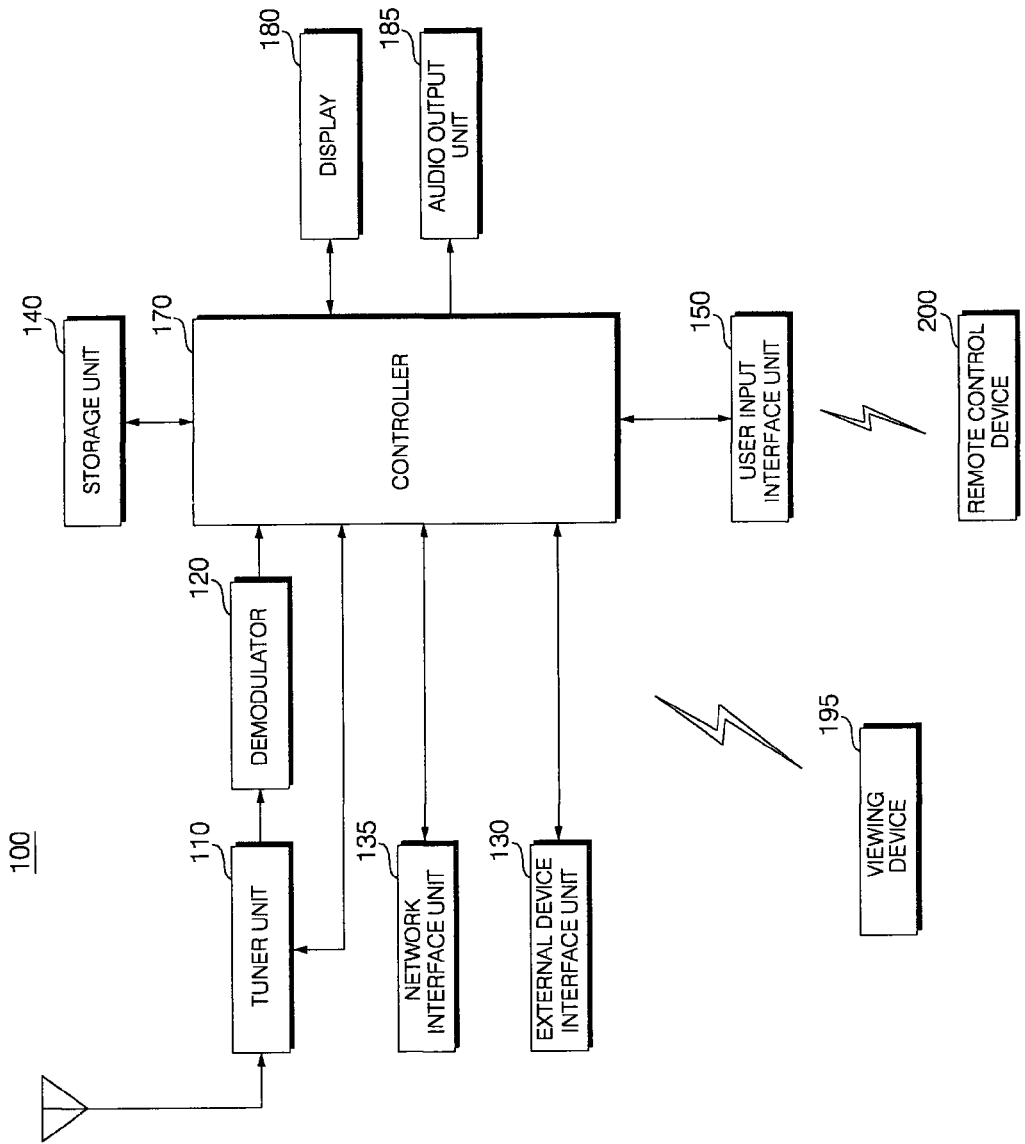
FIG. 1 is a block diagram showing an image display device according to an embodiment of the present invention.

FIG. 1 a block diagram showing an image display device according to an embodiment of the present invention.

Referring to FIG. 1, the image display device 100 according to the embodiment of the present invention includes a tuner unit 110, a demodulator 120, an external device interface unit 130, a network interface unit 135, a storage unit 140, a user input interface unit 150, a sensor unit 160, a controller 170, a display 180, an audio output unit 185, an photographing unit 190, and a viewing device 195.

The tuner unit 110 tunes to a Radio Frequency (RF) broadcast signal corresponding to a channel selected by a user from RF broadcast signals received through an antenna or corresponding to each of all stored channels. The tuned RF broadcast signal is converted into an Intermediate Frequency (IF) signal or a baseband video or audio signal.

For example, if the tuned RF broadcast signal is a digital broadcast signal, the tuned RF broadcast signal is converted into a digital IF (DIF) signal and, if the tuned RF broadcast signal is an analog broadcast signal, the tuned RF broadcast signal is converted into an analog baseband video/audio signal (Composite Video Baseband Signal (CVBS)/Sound IF (SIF)). That is, the tuner unit 110 may process a digital broadcast signal or an analog broadcast signal. The analog baseband video/audio signal (CVBS/SIF) output from the tuner unit 110 may be directly input to the controller 170.

In addition, the tuner unit 110 may receive a single-carrier RF broadcast signal according to an Advanced Television System Committee (ATSC) scheme or a multiple-carrier RF broadcast signal according to a Digital Video Broadcasting (DVB) scheme.

In the present invention, the tuner unit 110 may sequentially tune to the RF broadcast signals of all the broadcast channels stored through a channel storage function among the RF broadcast signals received through the antenna, and convert the signals into IF signals or baseband video or audio signals.

The tuner unit 110 may include a plurality of tuners in order to receive broadcast signals of a plurality of channels. The tuner unit 110 may also be a single tuner capable of simultaneously receiving broadcast signals of a plurality of channels.

The demodulator 120 receives the converted DIF signal from the tuner unit 110 and performs a demodulation operation.

For example, if the DIF signal output from the tuner unit 110 is based on the ATSC system, the demodulator 120 performs 8-Vestigial Side Band (VSB) modulation. In addition, the demodulator 120 may perform channel decoding. The demodulator 120 may include a trellis decoder, a deinterleaver, a Reed-Solomon decoder and the like and perform trellis decoding, deinterleaving and Reed-Solomon decoding.

For example, if the DIF signal output from the tuner unit 110 is based on the DVB system, the demodulator 120 performs Coded Orthogonal Frequency Division Multiple Access (COFDMA) modulation. In addition, the demodulator 120 may perform channel decoding. The demodulator 120 may include a convolutional decoder, a deinterleaver, a Reed-Solomon decoder and the like to perform convolutional decoding, deinterleaving and Reed-Solomon decoding.

The demodulator 120 may perform demodulation and channel decoding and then output a Transport Stream (TS) signal. The TS signal may be a signal in which an image signal, an audio signal and a data signal are multiplexed. For example, the TS signal may be an MPEG-2 TS in which an MPEG-2 image signal, a Dolby AC-3 audio signal and the like are multiplexed. Specifically, the MPEG-2 TS may include a 4-byte header and a 184-byte payload.

The demodulator 120 may separately include demodulators according to the ATSC scheme and the DVB scheme. That is, the demodulator 120 may include an ATSC modulator and a DVB demodulator.

The TS signal output from the demodulator 120 may be input to the controller 170. The controller 170 performs demultiplexing, image/audio signal processing and the like, and then outputs an image through the display 180 and audio through the audio output unit 185.

The external device interface unit 130 may transmit or receive data to or from an external device (not shown) connected to the interface unit 130. To accomplish this, the external device interface unit 130 may include an A/V input/output unit (not shown) or a wireless communication unit (not shown).

The external device interface unit 130 may be connected to the external device (not shown) such as a Digital Versatile Disk (DVD) player, a Blu-ray player, a game console, a camcorder or a (notebook) computer in a wired/wireless manner. The external device interface unit 130 sends an image signal, an audio signal or a data signal received from the connected external device (not shown) to the controller 170 of the image display device 100. The image signal, the audio signal or the data signal processed by the controller 170 may be output to the connected external device (not shown). To accomplish this, the external device interface unit 130 may include an A/V input/output unit (not shown) or a wireless communication unit (not shown).

The A/V input/output unit may include a Universal Serial Bus (USB) port, a CVBS terminal, a component terminal, an S-video terminal (analog), a Digital Visual Interface (DVI) terminal, a High Definition Multimedia Interface (HDMI) terminal, an RGB terminal, and a D-SUB terminal for inputting the image signal and the audio signal from the external device to the image display device 100.

The wireless communication unit may perform wireless Local Area Network (LAN) communication with another electronic device. The image display device 100 may be connected to another electronic device over a network according to the communication standard such as Bluetooth, Radio Frequency Identification (RFID), Infrared Data Association (IrDA), Ultra Wideband (UWB), ZigBee, or Digital Living Network Alliance (DLNA).

In addition, the external device interface unit 130 may be connected to various set-top boxes through at least one of the above-described various terminals so as to perform an input/output operation with the set-top boxes.

The external device interface unit 130 may transmit or receive data to or from the viewing device 195.

The network interface unit 135 provides an interface for connecting the image display device 100 to a wired/wireless network including an Internet network. The network interface unit 135 may include an Ethernet port for connection with a wired network. The network interface unit 135 may also use the communication standard such as Wireless LAN (WLAN) (Wi-Fi), Wireless broadband (Wibro), World Interoperability for Microwave Access (WiMax), or High Speed Downlink Packet Access (HSDPA) for connection with a wireless network.

The network interface unit 135 may receive content or data provided by an Internet or content provider or a network manager over a network. That is, the network interface unit 135 may receive content such as movies, advertisements, games, VOD, or broadcast signals and information associated with the content provided by the Internet or content provider over a network. In addition, the network interface unit 135 may receive update information and update files of firmware provided by the network manager. In addition, the network interface unit 135 may transmit data to the Internet or content provider or to the network manager.

In addition, the network interface unit 135 is connected to, for example, an Internet Protocol TV (IPTV) to receive and transmit an image, audio or data signal processed by a set-top box for IPTV to the controller 170 and to transmit signals processed by the controller 170 to the set-top box for IPTV in order to enable bidirectional communication.

The IPTV may include an ADSL-TV, a VDSL-TV, an FTTH-TV or the like according to the type of the transmission network or may include a TV over DSL, a Video over DSL, a TV over IP (TVIP), a Broadband TV (BTV), or the like. In addition, the IPTV may include an Internet TV capable of Internet access or a full-browsing TV.

The storage unit 140 may store a program for performing signal processing and control in the controller 170 and store a processed image, audio or data signal.

In addition, the storage unit 140 may perform a function to temporarily store an image, audio or data signal input through the external device interface unit 130. In addition, the storage unit 140 may store information about predetermined broadcast channels through a channel storage function such as a channel map.

The storage unit 140 may include at least one of a flash memory storage medium, a hard disk storage medium, a multimedia card micro medium, a card memory (e.g., SD memory, XD memory, or the like), a RAM, or a ROM (EE-PROM or the like). The image display device 100 may reproduce and provide a file, such as a moving image file, a still image file, a music file, a document file, or the like, stored in the storage unit 140 to the user.

Although FIG. 1 shows an example in which the storage unit 140 is provided separately from the controller 170, the present invention is not limited to this example. The storage unit 140 may be included in the controller 170.

The user input interface unit 150 sends a signal input by the user to the controller 170 or sends a signal from the controller 170 to the user.

For example, the user input interface unit 150 may receive a user input signal, such as power on/off, channel selection or screen setup, from a remote control device 200 or may transmit a signal from the controller 170 to the remote control device 200 according to various communication schemes such as a Radio Frequency (RF) communication scheme or an Infrared (IR) communication scheme.

In addition, for example, the user input interface unit 150 may send a user input signal input through a local key (not shown) such as a power key, a channel key, a volume key, or a setup value to the controller 170.

The sensor unit 160 may sense the position, gesture, or touch of the user or the position of the viewing device 195. To accomplish this, the sensor unit 160 may include a touch sensor, a voice sensor, a position sensor, a motion sensor, a gyro sensor, or the like.

A signal indicating the sensed position, gesture, or touch of the user or the sensed position of the viewing device 195 may be input to the controller 170. This signal may also be input to the controller 170 through the user input interface unit 150, unlike the illustration of FIG. 1.

The controller 170 may demultiplex the TS signal input through the tuner unit 110, the demodulator 120 or the external device interface unit 130 or may process demultiplexed signals to generate and output signals for an image or audio output.

The image signal processed by the controller 170 may be input to the display 180 such that an image corresponding to the image signal is displayed on the display 180. The image signal processed by the controller 170 may also be input to an external output device through the external device interface unit 130.

The audio signal processed by the controller 170 may be audibly output through the audio output unit 185. In addition, the audio signal processed by the controller 170 may be input to an external output device through the external device interface unit 130.

Although not shown in FIG. 1, the controller 170 may include a demultiplexer, an image processing unit, and the like as described later in detail with reference to FIG. 3.

The controller 170 may control the overall operation of the image display device 100. For example, the controller 170 may control the tuner unit 110 to tune to an RF broadcast corresponding to a channel selected by the user or a stored channel.

In addition, the controller 170 may control the image display device 100 according to a user command input through the user input interface unit 150 or an internal program.

For example, the controller 170 controls the tuner unit 110 to receive the signal of a channel selected according to a predetermined channel selection command received through the user input interface unit 150. The controller 170 then processes the image, audio or data signal of the selected channel. The controller 170 may allow information of the channel selected by the user to be output through the display 180 or the audio output unit 185 together with the image or audio signal.

In another example, the controller 170 may allow an image or audio signal received from the external device (not shown), for example, a camera or a camcorder, through the external device interface unit 130 to be output through the display 180 or the audio output unit 185 according to an external device image reproduction command received through the user input interface unit 150.

The controller 170 may control the display 180 to display an image. For example, the controller may allow a broadcast image input through the tuner unit 110, an external input image input through the external device interface unit 130, an image input through a network interface unit 135, or an image stored in the storage unit 140 to be displayed on the display 180.

Here, the image displayed on the display 180 may be a still image, a moving image, a 2D image or a 3D image.

The controller 170 generates and displays a predetermined object in the image displayed on the display 180 as a 3D object. For example, the object may be at least one of a web page (newspaper, magazine, or the like), an Electronic Program Guide (EPG), various menus, a widget, an icon, a still image, a moving image, or text.

Such a 3D object may provide a sense of depth different from that of the image displayed on the display 180. Preferably, the 3D object may be processed such that the 3D object appears to be located in front of the image displayed on the display 180.

The controller 170 determines a user's position based on an image captured using the photographing unit (not shown). The controller 170 can obtain, for example, a distance (z-axis coordinate) between the user and the image display device 100. In addition, the controller can obtain an X-axis coordinate and a y-axis coordinate on the display 180 corresponding to the user's position.

The controller 170 may perform signal processing for pairing with the viewing device 195. That is, the controller 170 may perform a control operation to output a pairing signal to the viewing device 195 and to receive a response signal from the viewing device 195.

On the other hand, although not shown in the drawing, the image display device 100 may further include a channel browsing processing unit for generating a thumbnail image corresponding to a channel signal or an external input signal. The channel browsing processing unit may receive a Transport Stream (TS) signal output from the demodulator 120 or a TS signal output from the external device interface unit 130, extract an image from the received TS signal, and generate a thumbnail image. The generated thumbnail image may be input to the controller 170 without conversion or after being encoded. In addition, the generated thumbnail image may be input to the controller 170 after being encoded into a stream format. The controller 170 may display a thumbnail list including a plurality of thumbnail images on the display 180 using the received thumbnail images. The thumbnail list may be displayed in a brief viewing manner in which the thumbnail list is displayed in a portion of the display 180 on which an image is being displayed, or in a full viewing manner in which the thumbnail list is displayed over most of the display 180. Thumbnail images in the thumbnail list may be sequentially updated.

The display 180 converts an image signal, a data signal, an OSD signal or a control signal processed by the controller 170 or an image signal, data signal or a control signal received through the external device interface unit 130 and generates a drive signal.

The display 180 may include a Plasma Display Panel (PDP), Liquid Crystal Display (LCD), an Organic Light Emitting Diode (OLED) display, and a flexible display. The display 180 may also include a 3D display. The display 180 for 3D image viewing may be divided into a supplementary display type and a single display type.

In the single display type, a 3D image is implemented on the display 180 without a separate subsidiary device, e.g., glasses. Examples of the single display type may include various types such as a lenticular type and a parallax barrier type.

In the supplementary display type, a 3D image is implemented using a subsidiary device as a viewing device 195, in addition to the display 180. Examples of the supplementary display type include various types such as a Head-Mounted Display (HMD) type and a glasses type.

The glasses type may be divided into a passive type such as a polarized glasses type and an active type such as a shutter glasses type. The HMD type may be divided into a passive type and an active type.

The viewing device 195 may also be 3D glasses that enable 3D image viewing. The 3D glasses 195 may include passive-type polarized glasses or active-type shutter glasses. The 3D glasses 195 will also be described as conceptually including the HMD type.

The display 180 may include a touch screen and function as an input device as well as an output device.

The audio output unit 185 receives the audio signal processed by the controller 170, for example, a stereo signal, a 3.1 channel signal or a 5.1 channel signal, and outputs corresponding audio. The audio output unit 185 may be implemented using various types of speakers.

The photographing unit (not shown) captures an image of the user. Although the photographing unit (not shown) may be implemented using one camera, the present invention is not limited to one camera and the photographing unit (not shown) may be implemented using a plurality of cameras. The photographing unit (not shown) may be provided at an upper portion of the display 180. Information of the image captured by the photographing unit (not shown) is input to the controller 170.

The controller 170 may sense the gesture of the user by the image captured using the photographing unit (not shown), the signal sensed using the sensing unit 160 or a combination thereof.

The remote control device 200 transmits a user input signal to the user input interface unit 150. To accomplish this, the remote control device 200 may use Bluetooth, Radio Frequency Identification (RFID) communication, IR communication, Ultra Wideband (UWB), or ZigBee. The remote control device 200 may receive the image, audio, or data signal output from the user input interface unit 150 and may then display or audibly output the received signal.

The image display device 100 may be a fixed digital broadcast receiver capable of receiving at least one of an ATSC (8-VSB) digital broadcast, a DVB-T (COFDM) digital broadcast or an ISDB-T (BST-OFDM) digital broadcast, or a mobile digital broadcast receiver capable of receiving at least one of a terrestrial DMB digital broadcast, a satellite DMB digital broadcast, an ATSC-M/H digital broadcast, a DVB-H (COFDM) digital broadcast or a media forward link only digital broadcast. In addition, the image display device 100 may be a cable, satellite or IPTV digital broadcast receiver.

The image display device described in the present specification may include a TV receiver, a projector, a mobile phone, a smart phone, a notebook computer, a digital broadcast terminal, a Personal Digital Assistant (PDA), a Portable Multimedia Player (PMP), or the like.

FIG. 1 is a block diagram of the image display device 100 according to one embodiment of the present invention. Some of the components of the image display device 100 shown in the block diagram may be combined or omitted or other components may be added thereto according to the specifications of the image display device 100 that is actually implemented. That is, two or more components of the image display device 100 may be combined into one component or one component thereof may be divided into two or more components as necessary. The functions of the components described below are only examples to describe the embodiments of the present invention and specific operations and units thereof do not limit the scope of the present invention.

The image display device 100 may not include the tuner unit 110 and the demodulation unit 120 shown in FIG. 1 and instead may receive and reproduce image content through the network interface unit 130 or the external device interface unit 135.

The image display device 100 is an example of an image signal processing device that performs signal processing upon a image stored in the device or an image input to the device. Other examples of the image signal processing device may include a set-top box, which does not include the display 180 and the audio output unit 185 shown in FIG. 1, a DVD player, a Blu-ray player, a game console, a camcorder, a computer, or the like. Details of the set-top box are described below with reference to FIGS. 2A to 2B.

Figure 2A:
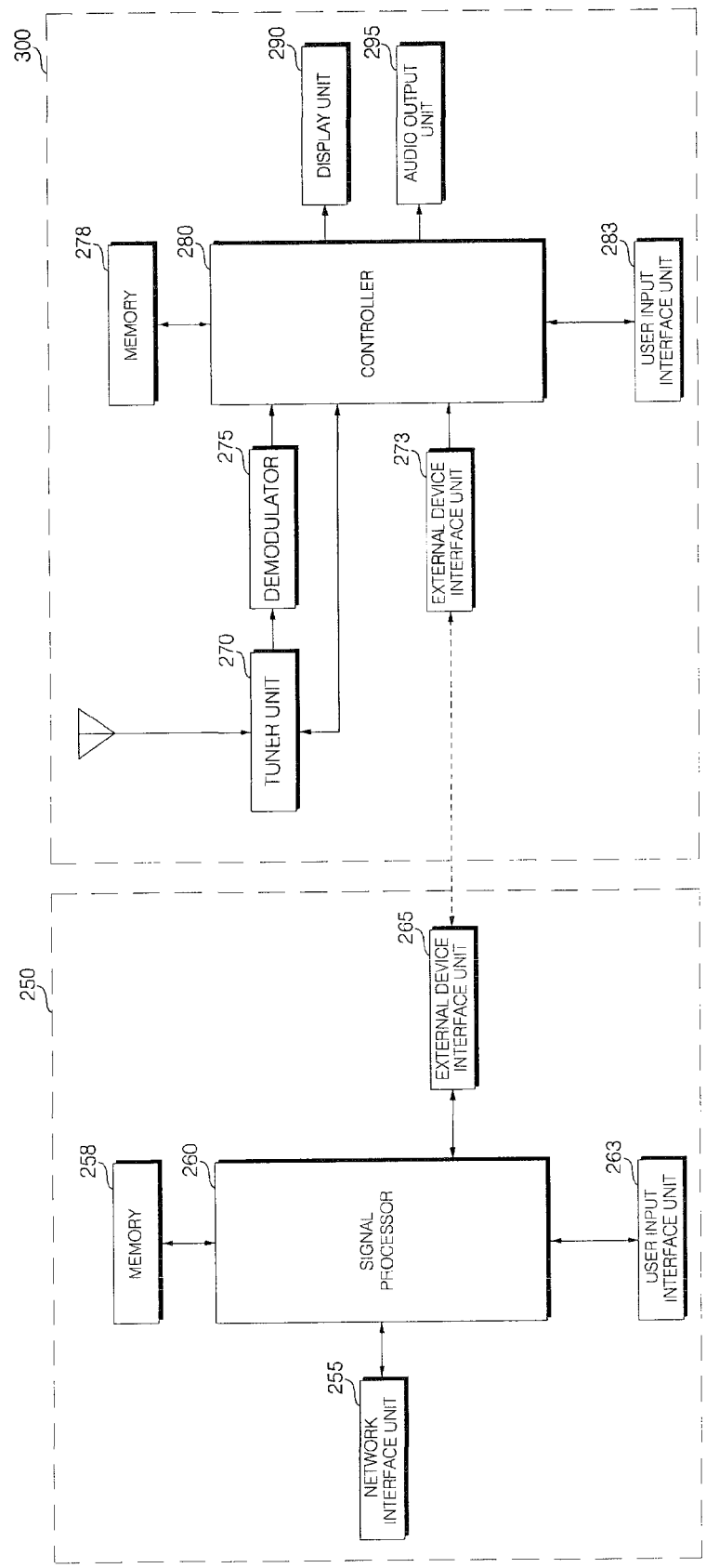
FIGS. 2A and 2B illustrate block diagrams of a set-top box and a display device according to an embodiment of the present invention.
Figure 2B:
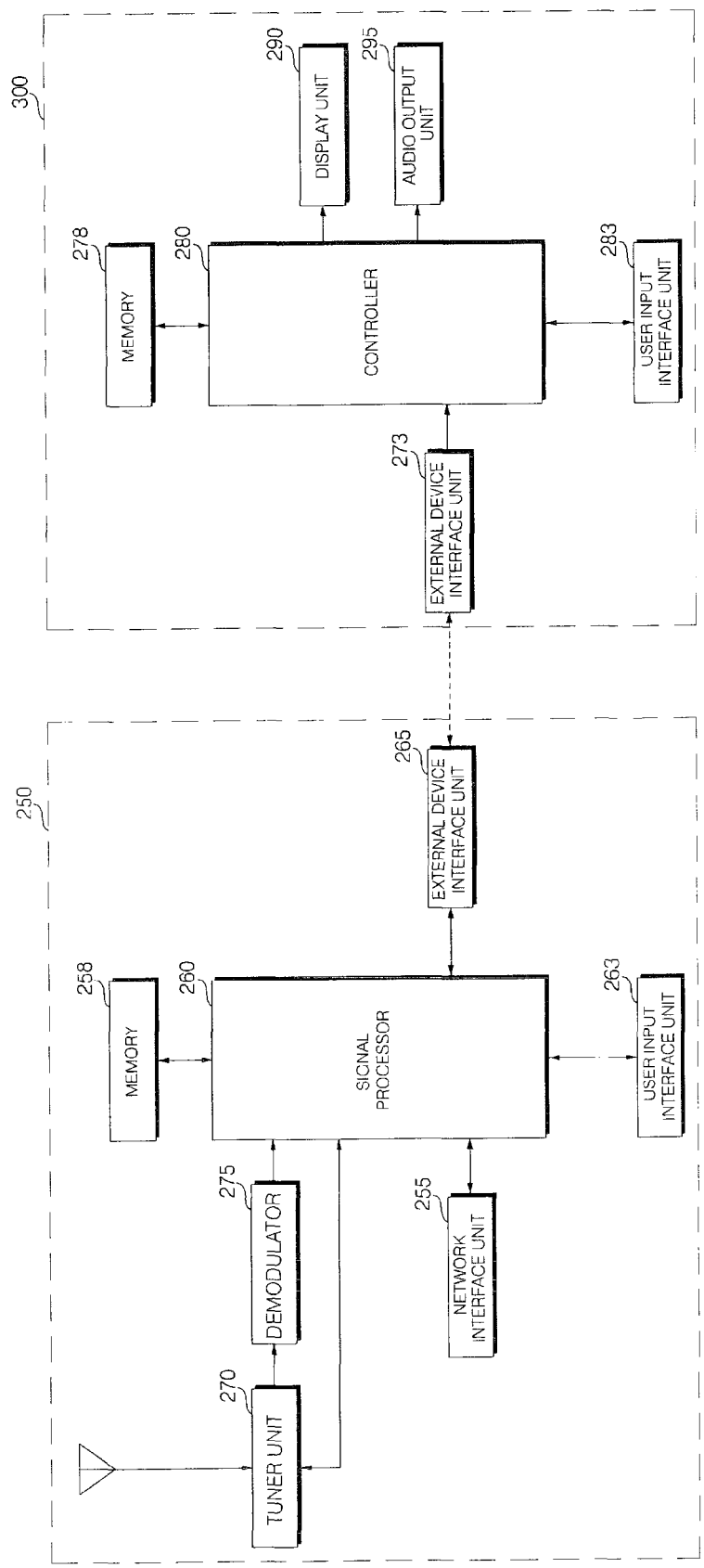

FIGS. 2A and 2B illustrate block diagrams of a set-top box and a display device according to an embodiment of the present invention.

First, as shown in FIG. 2A, the set-top box 250 and the display device 30 may transmit or receive data wirelessly or by wire. The following description is given, focusing on differences from FIG. 1.

The set-top box 250 may include a network interface unit 255, a storage unit 258, a user input interface unit 263, and an external device interface unit 265.

The network interface unit 255 provides an interface for connection to a wired/wireless network including the Internet. The network interface unit 255 may also transmit or receive data to or from another user or another electronic device through a connected network or another network linked to the connected network.

The storage unit 258 may store a program for implementing various signal processing and control in the signal processor 260 and may also perform a function to temporarily store video, audio, and data signals received from the external device interface unit 265 or from the network interface unit 255.

The signal processor 260 performs signal processing upon an input signal. For example, the signal processor 260 may perform demultiplexing or demodulation on an input image signal or may perform demultiplexing or demodulation on an input audio signal. To accomplish this, the signal processor 260 may include a video decoder or an audio decoder. The processed video or audio signal may be transmitted to the display device 300 through the external device interface unit 265.

The user input interface unit 263 may transfer a signal input by the user to the signal processor 260 or may transfer a signal from the signal processor 260 to the user. For example, the user input interface unit 263 may receive various control signals such as a power on/off signal, an operation-related input signal, a setting-related input signal that the user inputs through a local key (not shown) or through the remote control device 200 and may then transfer the received control signals to the signal processor 260.

The external device interface unit 265 provides an interface for transmitting or receiving data to or from an external device connected to the external device interface unit 265 wirelessly or by wire. Particularly, the display device 300 provides an interface for transmitting or receiving data to or from the display device 300. The external device interface unit 265 may also provide an interface for transmitting or receiving data to or from an external device such as a game console, a camera, a camcorder, or a (notebook) computer.

The set-top box 250 may further include a media input unit (not shown) for additional media playback. Examples of the media input unit include a Blu-ray input unit (not shown). That is, the set-top box 250 may include a Blu-ray player or the like. An input signal of media such as a Blu-ray disc may be subjected to signal processing such as demultiplexing or demodulation by the signal processor 260 and may then be transmitted to the display device 300 through the external device interface unit 265 in order to display the signal.

The display device 300 may include a tuner unit 270, an external device interface unit 273, a demodulation unit 275, a storage unit 278, a controller 280, a user input interface unit 283, a display unit 290, and an audio output unit 295.

The tuner unit 270, the demodulation unit 275, the storage unit 278, the controller 280, the user input interface unit 283, the display unit 290, and the audio output unit 295 correspond to the tuner unit 110, the demodulator 120, the storage unit 140, the controller 170, the user input interface unit 150, the display 180, and the audio output unit 185 and thus descriptions thereof are omitted herein.

The external device interface unit 273 provides an interface for transmitting or receiving data to or from an external device connected to the external device interface unit 273 by wire or wirelessly. Particularly, the external device interface unit 273 provides an interface for transmitting or receiving data to or from the set-top box 250.

Accordingly, a video signal or an audio signal input through the set-top box 250 is then output through the display unit 290 or the audio output unit 295 via the controller 280.

A set-top box 250 and a display device 300 shown in FIG. 2B are similar to the set-top box 250 and the display device 300 shown in FIG. 2A with the difference being that a tuner unit 270 and a demodulation unit 275 are provided in the set-top box 250 rather than in the display device 300. Only differences from FIG. 2A are described below.

A signal processor 260 may perform signal processing upon a broadcast signal received through the tuner unit 270 and the demodulation unit 275. A user input interface unit 263 may receive an input signal such as a channel selection signal or a channel storage signal input by the user.

Although the audio output unit 185 of FIG. 1 is not shown in the each of the set-top boxes 250 in FIGS. 2A and 2B, each set-top box 250 may also include a separate audio output unit.

Figure 3:
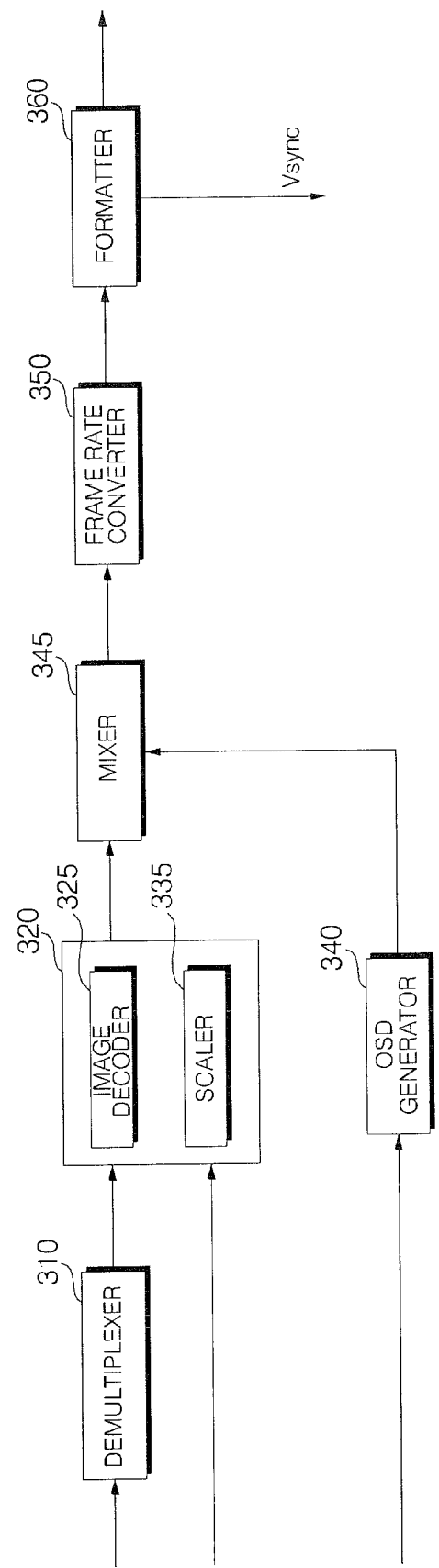
FIG. 3 is a block diagram of a controller shown in FIG. 1.

FIG. 3 is a block diagram showing the controller shown in FIG. 1, FIG. 4 illustrates various formats of a 3D image, and FIG. 5 illustrates an operation of a viewing device according to a frame sequential format shown in FIG. 4.

As shown in FIG. 3, the controller 170 according to one embodiment of the present invention may include a demultiplexer 310, an image processing unit 320, an OSD generator 340, a mixer 345, a Frame Rate Converter (FRC) 350, and a formatter 360. The controller 170 may further include an audio processing unit (not shown) and a data processing unit (not shown).

The demultiplexer 310 demultiplexes an input TS signal. For example, if an MPEG-2 TS signal is input, the demultiplexer may demultiplex the MPEG-2 TS signal into image, audio and data signals. The TS signal input to the demultiplexer 310 may be a TS signal output from the tuner unit 110, the demodulator 120 or the external device interface unit 130.

The image processing unit 320 may perform image processing upon the demultiplexed image signal. The image processing unit 320 may include an image decoder 325 and a scaler 335.

The image decoder 325 decodes the demultiplexed image signal and the scaler 335 adjusts the resolution of the decoded image signal such that the image signal can be output through the display 180.

The image decoder 325 may include various types of decoders. For example, the image decoder 325 may include at least one of an MPEG-2 decoder, an H.264 decoder, an MPEG-C decoder (MPEG-C part 3), an MVC decoder, and an FTV decoder.

The image signal decoded by the image processing unit 320 may include a 2D image signal alone, a mixture of a 2D image signal and a 3D image signal, or a 3D image signal alone.

For example, an external image signal received from the photographing unit (not shown) or a broadcast image signal of a broadcast signal received through the tuner unit 110 may include a 2D image signal alone, a mixture of a 2D image signal and a 3D image signal, or a 3D image signal alone. Accordingly, thereafter, the controller 170, specifically, the image processing unit 320 in the controller 170, may perform signal processing upon the external image signal or the broadcast image signal to output a 2D image signal alone, a mixture of a 2D image signal and a 3D image signal, or a 3D image signal alone.

The image signal decoded by the image processing unit 320 may include a 3D image signal in various formats. For example, the decoded image signal may be a 3D image signal including a color difference image and a depth image, or a 3D image signal including multi-view image signals. The multi-view image signals may include, for example, a left-eye image signal and a right-eye image signal.

As shown in FIG. 4, the format of the 3D image signal may include a side-by-side format (FIG. 4(a)) in which the left-eye image L and the right-eye image R are arranged in a horizontal direction, a top/down format (FIG. 4(b)) in which the left-eye image and the right-eye image are arranged in a vertical direction, a frame sequential format (FIG. 4(c)) in which the left-eye image and the right-eye image are arranged in a time division manner, an interlaced format (FIG. 4(d)) in which the left-eye image and the right-eye image are mixed in lines, and a checker box format (FIG. 4(e)) in which the left-eye image and the right-eye image are mixed in boxes.

The OSD generator 340 generates an OSD signal according to a user input signal or automatically. For example, the OSD generator 340 may generate a signal for displaying a variety of information as graphics or text on the screen of the display 180 based on a user input signal. The generated OSD signal may include a variety of data such as a user interface screen, various menu screens, a widget or an icon of the image display device 100. The generated OSD signal may include a 2D object or a 3D object.

The mixer 345 may mix the OSD signal generated by the OSD generator 340 with the image signal decoded by the image processing unit 320. Here, each of the OSD signal and the decoded image signal may include at least one of a 2D signal and a 3D signal. The mixed image signal is provided to the frame rate converter 350.

The frame rate converter 350 converts the frame rate of the input image. For example, a frame rate of 60 Hz is converted into 120 Hz or 240 Hz. In the case where the frame rate of 60 Hz is converted into 120 Hz, the frame rate converter 350 may insert a first frame between the first frame and a second frame or may insert a third frame estimated from the first frame and the second frame between the first frame and the second frame. In the case where the frame rate of 60 Hz is converted into 240 Hz, the frame rate converter 350 may insert the same three frames or three estimated frames between the frames.

The frame rate converter 350 may also directly output an input image signal without frame rate conversion. Preferably, when a 2D image signal is input to the frame rate converter 350, the frame rate converter 350 may directly output the 2D image signal without frame rate conversion. On the other hand, when a 3D image signal is input, the frame rate converter 350 may convert the frame rate of the 3D image signal as described above.

The formatter 360 may receive the mixed signal (i.e., the mixture of the OSD signal and the decoded image signal) from the mixer 345 and separate it into a 2D image signal and a 3D image signal.

In the present specification, the 3D image signal includes a 3D object. Examples of such an object may include a Picture In Picture (PIP) image (still image or moving image), an EPG indicating broadcast program information, various menus, a widget, an icon, text, or an object, a person or a background present in an image, a web page (newspaper, magazine, or the like), etc.

The formatter 360 may change the format of the 3D image signal to, for example, any of the various formats shown in FIG. 4.

FIG. 5(a) shows the operation of the 3D glasses 195 (specifically, shutter glasses) when the formatter 360 arranges and outputs the 3D image signal in the frame sequential format from among the formats shown in FIG. 4.

Specifically, FIG. 5(a) shows the case where the left-eye glass of the shutter glasses 195 is opened and the right-eye glass of the shutter glasses is closed when the left-eye image L is displayed on the display 180 and shows the case where the left-eye glass of the shutter glasses 195 is closed and the right-eye glass of the shutter glasses is opened when the right-eye image R is displayed on the display 180.

FIG. 5(b) shows another exemplary operation of the 3D glasses 195, especially in case of polarized glasses, when the format of the 3D image signal is a side-by-side format (FIG. 4(a)). In this case, the 3D glasses 195 may be the shutter glasses 195. The left and right-eye glasses of the shutter glasses may be kept opened and instead the polarization directions of the left and right-eye glasses may be different. That is, the shutter glasses may operate as passive-type polarized glasses.

The formatter 360 may switch a 2D image signal to a 3D image signal. For example, according to a 3D image generation algorithm, the formatter 360 may detect an edge or a selectable object from a 2D image signal and may then separate an object according to the detected edge or selectable object to generate a 3D image signal. The formatter 360 may then separate and arrange the generated 3D image signal into a left-eye image signal L and a right-eye image signal R as described above.

Although not illustrated, the controller 170 may further include a 3D processor (not shown) for 3-dimensional (3D) effects signal processing, downstream of the formatter 360.

The 3D processor (not shown) may perform signal processing for brightness, tint, and color adjustment of an image signal in order to increase 3D effects. For example, the 3D processor may perform signal processing for making a near image portion clear and making a distant image portion unclear. The functions of the 3D processor may be incorporated into the formatter 360 or the image processing unit 320 as described later with reference to FIG. 6.

The audio processing unit (not shown) in the controller 170 may perform audio processing upon the demultiplexed audio signal. To accomplish this, the audio processing unit (not shown) may include various decoders.

For example, when the demultiplexed audio signal is a coded audio signal, the audio processing unit may decode the coded audio signal. Specifically, when the demultiplexed audio signal is an audio signal coded based on the MPEG-2 standard, the audio processing unit may decode the audio signal using an MPEG-2 decoder. When the demultiplexed audio signal is an audio signal coded based on the MPEG 4 Bit Sliced Arithmetic Coding (BSAC) standard according to a terrestrial DMB scheme, the audio processing unit may decode the audio signal using an MPEG 4 decoder. When the demultiplexed audio signal is an audio signal coded based on the MPEG-2 Advanced Audio Codec (AAC) standard according to the satellite DMB or DVB-H scheme, the audio processing unit may decode the audio signal using an AAC decoder. When the demultiplexed audio signal is an audio signal coded based on the Dolby AC-3 standard, the audio processing unit may decode the audio signal using an AC-3 decoder.

The audio processing unit (not shown) in the controller 170 may perform base and treble adjustment (equalization), volume adjustment, or the like.

The data processing unit (not shown) in the controller 170 may perform data processing upon the demultiplexed data signal. For example, if the demultiplexed data signal is a coded data signal, the data processing unit may decode the coded data signal. The coded data signal may be EPG information including broadcast information such as a start time and an end time of a broadcast program broadcast through each channel. For example, the EPG information may include ATSC-Program and System Information Protocol (ATSC-PSIP) information in the ATSC system and include DVB-Service Information (DVB-SI) in the DVB system. The ATSC-PSIP information and the DVB-SI may be included in a (4-byte) header of the above-described TS, that is, the MPEG-2 TS.

Although, in the example of FIG. 3, the signals from the OSD generator 340 and the image processing unit 320 are mixed by the mixer 345 and are then subjected to 3D processing by the formatter 360, the present invention is not limited to the example of FIG. 3 and the mixer 345 may be located downstream of the formatter 360. That is, the formatter 360 may perform 3D processing upon the output of the image processing unit 320 to generate a 3D signal and the OSD generator 340 may generate an OSD signal and perform 3D processing upon the OSD signal to generate a 3D signal, and the mixer 345 may then mix the 3D signals.

The controller 170 shown in the block diagram of FIG. 3 is an embodiment of the present invention. Some of the components of the controller 170 may be combined or omitted or other components may be added thereto according to the type of the controller 170 that is actually implemented.

In particular, the frame rate converter 350 and the formatter 360 may be individually provided outside the controller 170.

FIG. 6 illustrates various scaling schemes of a 3D image signal according to an embodiment of the present invention.

As shown in FIG. 6, the controller 170 may perform 3D effects signal processing for increasing 3D effects on the 3D image signal. Specifically, the controller 170 may perform signal processing for adjusting the size or slope of a 3D object in the 3D image.

The controller 170 may wholly enlarge or reduce a 3D image signal or a 3D object 510 in the 3D image signal at a specific ratio as shown in FIG. 6(*a*), where the reduced 3D object is denoted by "512". In addition, the controller 170 may partially enlarge or reduce the 3D object 510 into trapezoidal forms 514 and 516 as shown in FIGS. 6(*b*) and 6(*c*). The controller 170 may also rotate at least part of the 3D object 510 into a parallelogram form 518 as shown in FIG. 6(*d*). The stereoscopic effect (i.e., 3D effect) of the 3D image or the 3D object in the 3D image can be more emphasized through such scaling (i.e., size adjustment) or slope adjustment.

The difference between both parallel sides of the parallelogram form 514 or 516 increases as shown in FIG. 6(*b*) or 6(*c*) or the rotation angle increases as shown in FIG. 6(*d*) as the slope increases.

The size adjustment or slope adjustment may be performed after the formatter 360 arranges the 3D image signal in a specific format. The size adjustment or slope adjustment may be performed by the scaler 335 in the image processing unit 320. The OSD generator 340 may generate an OSD object in any of the forms illustrated in FIG. 6 to emphasize 3D effects.

Although not illustrated, signal processing such as brightness, tint, or color adjustment, in addition to size or slope adjustment illustrated in FIG. 6, may be performed on an image signal or object to increase 3D effects. For example, signal processing may be performed for making a near portion clear and making a distant portion unclear. Such 3D effects signal processing may be performed in the controller 170 or in a separate 3D processor. When the 3D effects signal processing is performed in the controller 170, the 3D effects signal processing may be performed, together with size or slope adjustment, in the formatter 360 or may be performed in the image processing unit 320.

Figure 7:
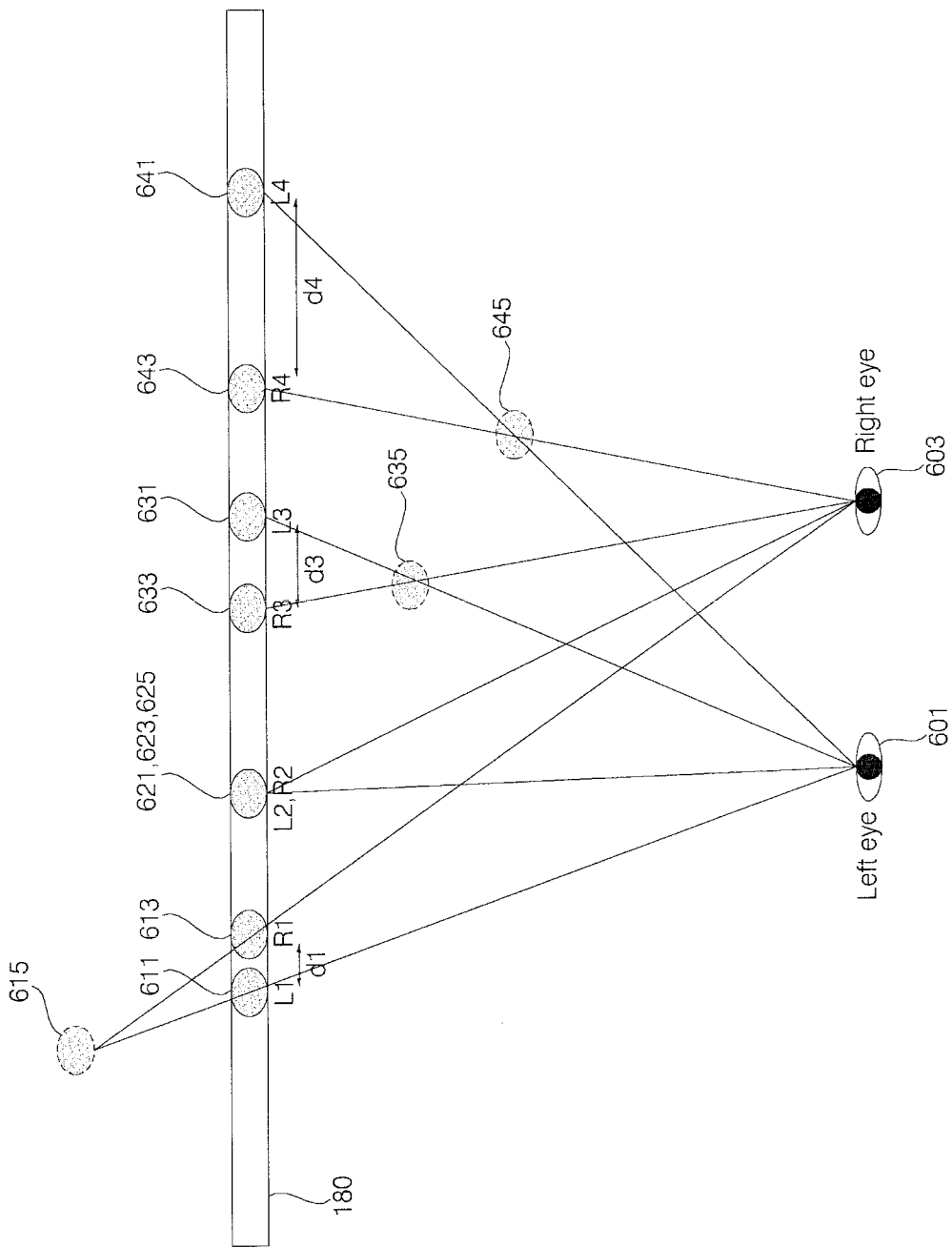
FIG. 7 illustrates how an image is formed by a left-eye image and a right-eye image.
Figure 8:
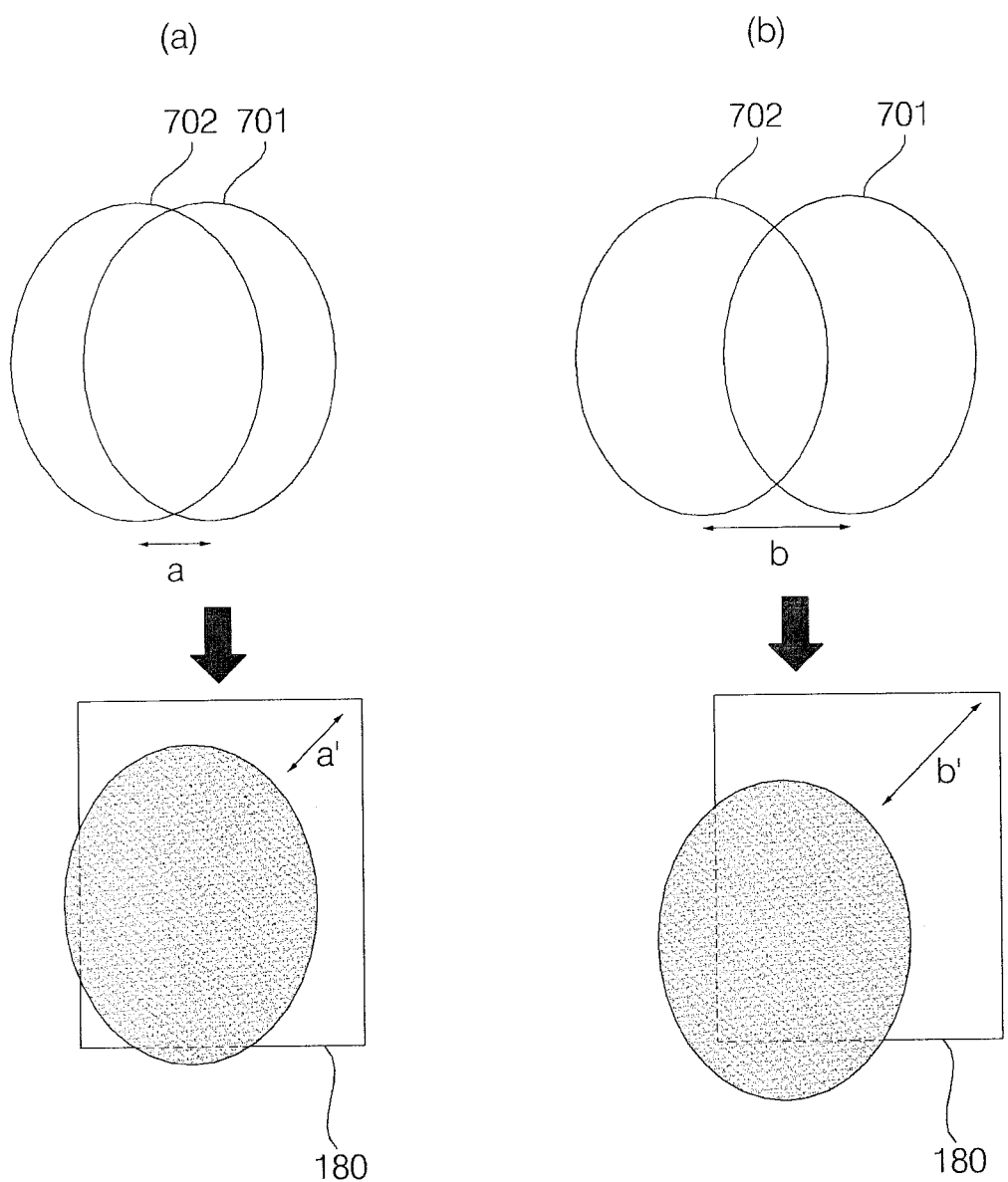
FIG. 8 illustrates the depth of a 3D image according to the distance between a left-eye image and a right-eye image.

FIG. 7 illustrates image formation by a left-eye image and a right-eye image, and FIG. 8 illustrates the depth of a 3D image according to the distance between a left-eye image and a right-eye image.

A plurality of images or a plurality of objects 615, 625, 635 and 645 is illustrated in FIG. 7.

First, the first object 615 includes a first left-eye image 611 (L) based on a first left-eye image signal and a first right-eye image 613 (R) based on a first right-eye image signal. A distance between the first right-eye image 613 and the first left-eye image 611 on the display 180 is d1 as illustrated. Here, the user perceives that an image is formed at an intersection of a line connecting the left eye 601 and the first left-eye image 611 and a line connecting the right eye 603 and the first right-eye image 613. Accordingly, the user perceives that the first object 615 is located behind the display unit 180.

Next, the second object 625 includes a second left-eye image 621 (L) and a second right-eye image 623 (R). Since the second left-eye image 621 and the second right-eye image 623 are displayed so as to overlap each other on the display unit 180, a distance between the second left-eye image 621 and the second right-eye image 623 is 0 as illustrated. Accordingly, the user perceives that the second object 625 is located on the display 180.

Next, the third object 635 includes a third left-eye image 631 (L) and a third right-eye image 633 (R), and the fourth object 645 includes a fourth left-eye image 641 (L) and a fourth right-eye image 643 (R). The distance between the third left-eye image 631 and the third right-eye image 633 is d3 and the distance between the fourth left-eye image 641 and the fourth right-eye image 643 is d4 as illustrated.

According to the above-described method, the user perceives that the third objects 635 and the fourth object 645 are located at image formation locations and thus are located in front of the display 180 as shown in FIG. 7.

Here, the user perceives that the fourth object 645 is located in front of the third object 635, i.e., protrudes from the third object 635, since the distance d4 between the fourth left-eye image 641 (L) and the fourth right-eye image 643 (R) is greater than the distance d3 between the third left-eye image 631 (L) and the third right-eye image 633 (R).

In the embodiment of the present invention, the distance between the display 180 and each of the objects 615, 625, 635 and 645, which is perceived by the user, is expressed by a "depth". The depth of the object that appears to the user to be located behind the display 180 has a negative value (−) and the depth of the object that appears to the user to be located in front of the display 180 has a positive value (+). That is, the depth increases as the degree of protrusion of the object from the display toward the user increases.

From FIG. 8, it can be seen that, when the distance a between a left-eye image 701 and a right-eye image 702 shown in FIG. 8(a) is less than the distance b between a left-eye image 701 and a right-eye image 702 shown in FIG. 8(b), the depth a' of the 3D object of FIG. 8(a) is less than the depth b' of the 3D object of FIG. 8(b).

When the 3D image includes a left-eye image and a right-eye image, a position at which the image is formed as perceived by the user changes according to the distance between the left-eye image and the right-eye image. Accordingly, by adjusting the displayed distance between the left-eye image and the right-eye image, it is possible to adjust the depth of the 3D image or the 3D object including the left-eye image and the right-eye image.

Figure 10:
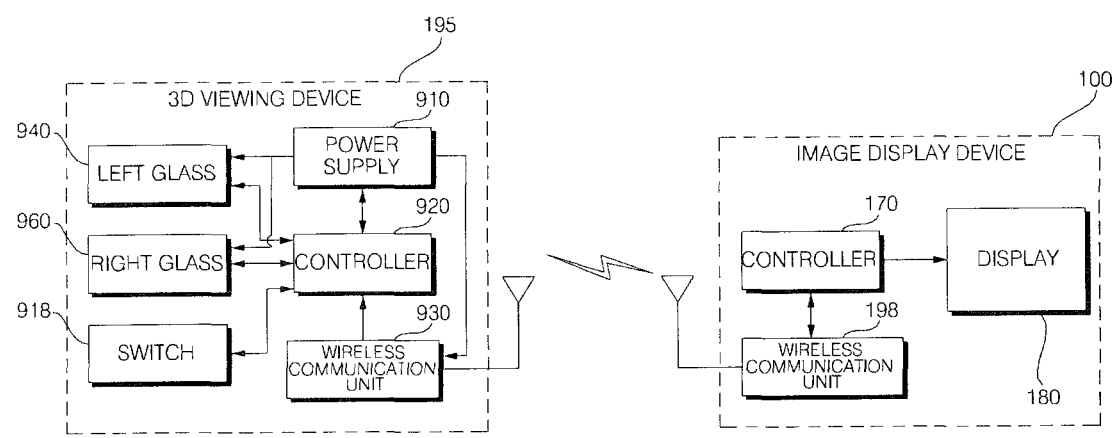
FIG. 10 is a block diagram of the 3D viewing device and the image display device of FIG. 9.

FIG. 9 illustrates a 3D viewing device and an image display device according to an embodiment of the present invention and FIG. 10 is a block diagram of the 3D viewing device and the image display device of FIG. 9.

As shown in FIGS. 9 and 10, the 3D viewing device 195 according to the embodiment of the present invention may include a power supply unit 910, a switch 918, a controller 920, a wireless communication unit 930, a left glass 940, and a right glass 960.

The power supply unit 910 supplies power to the left glass 940 and the right glass 960. As described above with reference to FIGS. 4 to 6, a drive voltage VthL is applied to the left glass 940 and a drive voltage VthR is applied to the right glass 960. Liquid crystal alignment in the left glass 940 and the right glass 960 may be changed according to the applied drive voltages VthL and VthR and light transmittance of the left glass 940 and the right glass 960 may be changed accordingly. Thus, each of the left glass 940 and the right glass 960 may be opened according to the applied drive voltage.

The levels of the drive voltages VthL and VthR may be different. Particularly, when the 3D viewing device 195 is of a type which changes the polarization directions of the left glass 940 and the right glass 960, the polarization directions of the left and right glasses 940 and 960 may be changed according to the drive voltages VthL and VthR.

The power supply unit 910 may supply operation power to the controller 920 and the wireless communication unit 930 in the 3D viewing device 195.

The switch 918 is used to turn the 3D viewing device 195 on or off. Specifically, the switch 918 is used to turn power to the 3D viewing device 195 on or off. That is, when the switch 918 is turned on, the power supply unit 910 is activated to supply power to the controller 920, the wireless communication unit 930, the left glass 940, and the right glass 960.

The controller 920 may control the left glass 940 and the right glass 960 in the 3D viewing device 195 to be opened or closed in synchronization with a left-eye image frame and a right-eye image frame displayed on the display 180 of the image display device 100. Here, the controller 920 may open or close the left glass 940 and the right glass 960 in synchronization with a synchronization signal Vsync received from the wireless communication unit 198 in the image display device 100.

In the case where a 2D image is displayed on the image display device 100, the controller 920 may control the left glass 940 and the right glass 960 to be simultaneously opened or closed in synchronization with the synchronization signal Vsync. In the case where a 3D image is displayed on the image display device 100, the controller 920 may control the left glass 940 and the right glass 960 to be alternately opened or closed according to the synchronization signal Vsync.

The controller 920 may control the operation of the power supply unit 910 and the wireless communication unit 930. When the switch 918 is turned on, the controller 920 may control the power supply unit 910 to be activated to supply power to each component.

The controller 920 may control the wireless communication unit 930 to transmit a pairing signal to the image display device 100 to perform pairing with the image display device 100. The controller 920 may also receive a pairing signal from the image display device 100.

The wireless communication unit 930 may transmit or receive data to or from the wireless communication unit 198 of the image display device 100 using an Infrared (IR) scheme or a Radio Frequency (RF) scheme. Specifically, the wireless communication unit 930 may receive a synchronization signal Vsync for opening or closing the left glass 940 and the right glass 960 from the wireless communication unit 198 of the image display device 100. Opening and closing operations of the left glass 940 and the right glass 960 are controlled according to the synchronization signal Vsync.

The wireless communication unit 930 may transmit or receive a pairing signal to or from the image display device 100. The wireless communication unit 930 may also receive a synchronization signal Vsync from the image display device 100. The wireless communication unit 930 may also transmit a signal indicating whether or not the 3D viewing device 195 is being used to the image display device 100.

The left glass 940 and the right glass 960 may be active-type left and right glasses that are opened according to an applied electrical signal (voltage or current).

For example, the left glass 940 and the right glass 960 may be opened according to a synchronization signal Vsync from the image display device 100. The 3D viewing device 195 may be shutter glasses as described above.

The polarization directions of the left glass 940 and the right glass 960 may also be changed according to an applied voltage.

The image display device 100 may include the wireless communication unit 198, the controller 170, and the display 180 as described above. The following description will focus on the operation of the 3D viewing device 195.

When a 3D viewing device 195 is detected, the wireless communication unit 198 in the image display device 100 may transmit a pairing signal to the 3D viewing device 195 for pairing with the 3D viewing device 195. The wireless communication unit 198 may also receive a response signal from the 3D viewing device 195.

The wireless communication unit 198 in the image display device 100 may transmit a synchronization signal Vsync to the 3D viewing device 195. The wireless communication unit 198 may also transmit a signal indicating whether a 2D or 3D image is displayed. This allows the left glass 940 and the right glass 960 of the 3D viewing device 195 to be simultaneously opened or closed or to be alternately opened or closed.

When a plurality of 3D viewing devices is present, the wireless communication unit 198 in the image display device 100 may transmit respective synchronization signals to each of the 3D viewing devices. The wireless communication unit 198 may also transmit audio signals for audio output to the 3D viewing devices.

Wireless communication between the image display device 100 and the 3D viewing device 195 may be performed using various communication schemes such as IR, RF, and Bluetooth schemes.

Figure 11:
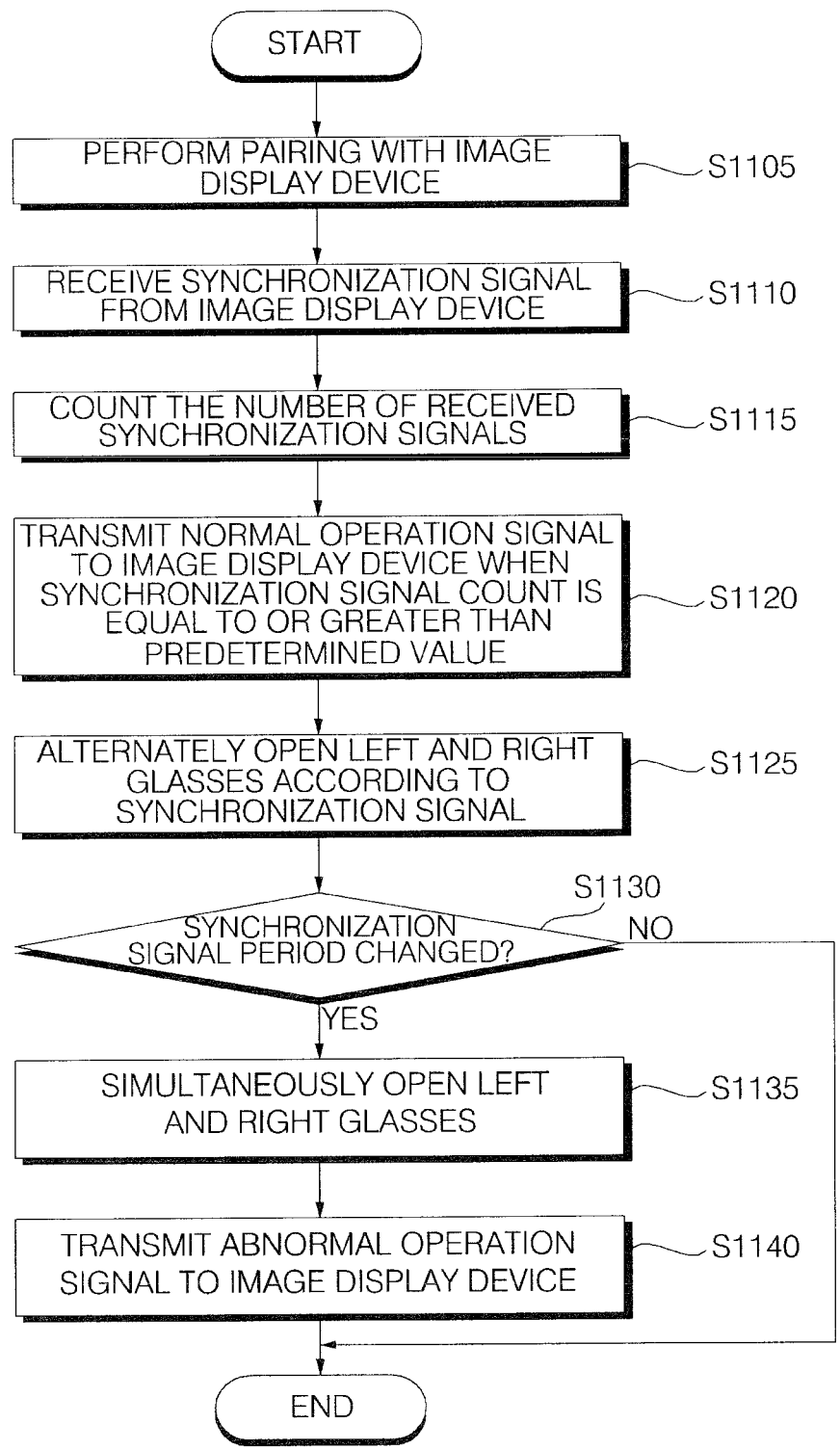
FIG. 11 is a flow chart illustrating a method for operating a 3D viewing device according to an embodiment of the present invention.

FIG. 11 is a flow chart illustrating a method for operating a 3D viewing device according to an embodiment of the present invention and FIGS. 12 to 18 illustrate various examples of the method for operating a 3D viewing device.

Referring to FIG. 11, first, the 3D viewing device 195 performs pairing with the image display device 100 (S1105). The 3D viewing device 195 then receives a synchronization signal from the image display device 100 (S1110).

For example, the 3D viewing device 195 may perform pairing with the image display device 100 when the 3D viewing device 195 is turned on through operation of the switch 918 as shown in FIGS. 9 and 10. Alternatively, the 3D viewing device 195 may perform pairing with the image display device 100 when the image display device 100 displays a 3D image or will soon display a 3D image.

The 3D viewing device 195 may receive a pairing signal for performing pairing from the image display device 100. Upon receiving the pairing signal, the 3D viewing device 195 may transmit a response signal to the image display device 100. Here, the controller 920 may control the 3D viewing device 195 to transmit the response signal.

On the other hand, the 3D viewing device 195 may transmit a pairing signal to the image display device 100. Here, the controller 920 may control the 3D viewing device 195 to transmit the pairing signal.

When pairing is completed, the image display device 100 may transmit a synchronization signal Vsync. The synchronization signal Vsync may be used to open and close the left glass 940 and the right glass 960 of the 3D viewing device 195.

The synchronization signal Vsync may be generated by the formatter 360 in the controller 170 as described above with reference to FIG. 3. The generated synchronization signal Vsync is transmitted to the 3D viewing device 195 through the wireless communication unit 198 as shown in FIG. 10.

Figure 12:
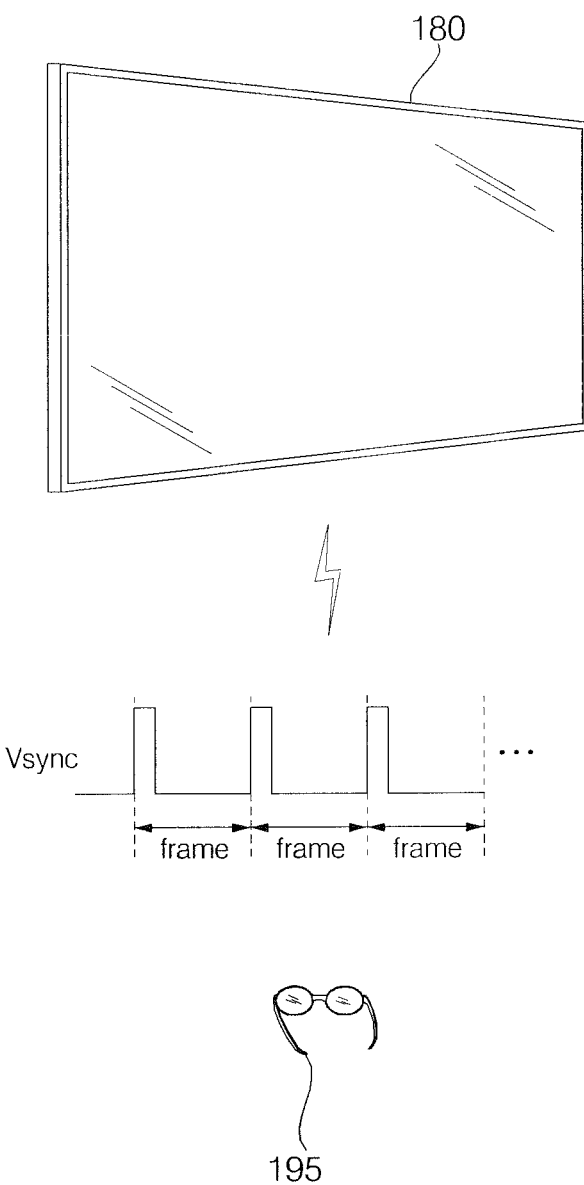

FIG. 12 illustrates that a synchronization signal Vsync is transmitted from the image display device to the 3D viewing device. Specifically, FIG. 12 illustrates that one synchronization signal Vsync is transmitted per frame. That is, when one pair of a left-eye image and a right-eye image is considered one frame, the synchronization signal Vsync may be synchronized with one of the left and right images.

FIG. 13A illustrates that the synchronization signal Vsync is synchronized with a left-eye image 1310 including an object 1315 from among the left-eye image including the object 1315 and a right-eye image 1320 including an object 1325.

Accordingly, during a first period T1, the left-eye image 1310 is displayed on the display 180 and the left glass 940 of the 3D viewing device 195 is opened. Then, during a second period T2, the right-eye image 1320 is displayed on the display 180 and the right glass 960 of the 3D viewing device 195 is opened.

Figure 13B:
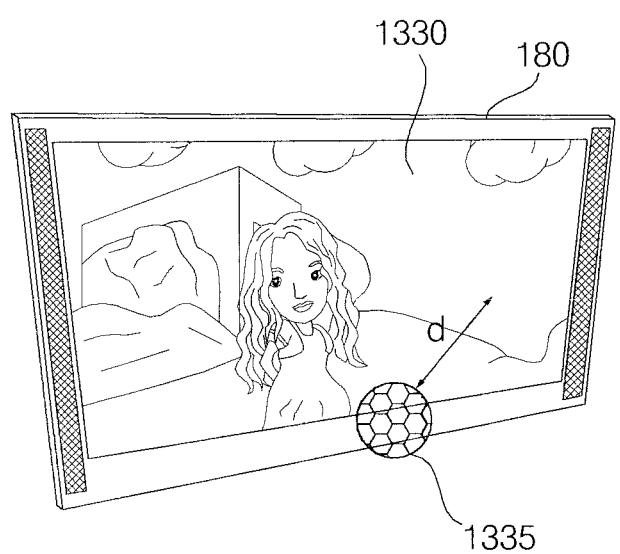

This allows a user wearing the 3D viewing device 195 to view a 3D image 1330 as shown in FIG. 13B. Specifically, a 3D object 1335 may appear to protrude from the display 180 by a depth d.

Although the synchronization signal Vsync is synchronized with one of the left-eye and right-eye images in the example illustrated in FIGS. 12 and 13, the synchronization signal Vsync may also be synchronized with each of the left-eye and right-eye images.

Then, the number of received synchronization signals is counted (S1115). When the counted number is equal to or greater than a predetermined value, a normal operation signal is transmitted to the image display device 100 (S1120). Then, the left and right glasses are alternately opened according to the synchronization signals (S1125).

The controller 920 in the 3D viewing device 195 counts the number of received synchronization signals Vsync per frame (for example, every 1/60th of a second) through the wireless communication unit 930. Specially, the controller 920 may count rising edges of synchronization signals Vsync.

The controller 920 in the 3D viewing device 195 determines that synchronization signal reception is stable when the number of consecutively received synchronization signals Vsync is greater than a predetermined value. Accordingly, the controller 920 may transmit a normal operation signal to the image display device 100. The controller 920 may selectively perform such normal operation signal transmission.

Alternatively, the controller 920 in the 3D viewing device 195 may determine a synchronization signal period at intervals of which synchronization signals Vsync are received. The controller 920 may determine that synchronization signal reception is stable when the synchronization signal period is within a predetermined range (for example, a range between 16 ms (i.e., 1/60th of a second) and 21 ms).

The controller 920 in the 3D viewing device 195 alternately opens the left glass 940 and the right glass 960 based on received synchronization signals Vsync. This operation has already been explained with reference to FIG. 13A. Accordingly, a user wearing the 3D viewing device 195 can view a 3D image as shown in FIG. 13B.

The controller 920 then determines whether or not the synchronization signal period has changed. Upon determining that the synchronization signal period has changed, the controller 920 simultaneously opens the left and right glasses in the display period of a left-eye image or a right-eye image included in a 3D image displayed on the image display device 100 (S1135). The controller 920 then transmits an abnormal operation signal to the image display device 100 (S1140).

The controller 920 in the 3D viewing device 195 determines whether or not the synchronization signal period has changed while counting the number of received synchronization signals per frame (for example, every 1/60th of a second) through the wireless communication unit 930.

For example, the 3D viewing device 195 may fail to receive a synchronization signal Vsync for a predetermined time period when another user moves between the user wearing the 3D viewing device 195 and the image display device 100. While counting the number of received synchronization signals, the controller 920 in the 3D viewing device 195 may determine that the synchronization signal period has changed when no synchronization signal is received for a predetermined period.

That is, the synchronization signal period may be, for example, 1/60th of a second during a normal operation and the synchronization signal period may be changed to ⅓₀th of a second or ⅟₁₅ of a second during an abnormal operation. That is, the synchronization signal period may increase during an abnormal operation.

The controller 920 in the 3D viewing device 195 may determine that the synchronization signal period has changed when the synchronization signal period is out of a predetermined range (for example, a range between 16 ms (i.e., ⅟₆₀th of a second) and 21 ms).

FIG. 14 illustrates that no synchronization signal Vsync is transmitted from the image display device 100 to the 3D viewing device 195 as described above.

FIG. 15A illustrates that a left-eye image 1310 including an object 1315 and a right-eye image 1320 including an object 1325 are displayed on the display for different times.

Here, as shown in FIG. 14, when the 3D viewing device 195 does not receive a synchronization signal Vsync, both the left glass 940 and the right glass 960 of the 3D viewing device 195 may be opened during a third period T3 in which both the left-eye image 1310 and the right-eye image 1320 are displayed.

Figure 15B:
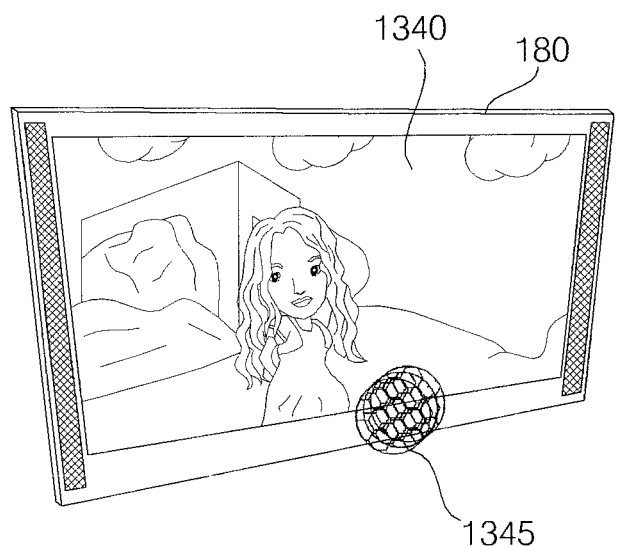

Accordingly, the user wearing the 3D viewing device 195 sees the 3D object 1345 as a double image when viewing a 3D image 1340 as shown in FIG. 15B. Thus, the user cannot reliably (or correctly) view the 3D object.

FIG. 16 illustrates that a left-eye image 1310 including an object 1315 and a right-eye image 1320 including an object 1325 are displayed on the display for different times, similar to FIG. 15A.

However, in the example illustrated in FIG. 16, the left glass 940 of the 3D viewing device 195 is opened during a fourth period T4 and the right glass 960 of the 3D viewing device 195 is opened during a fifth period T5 even though a synchronization signal Vsync is not input to the 3D viewing device 195. That is, when the right-eye image 1320 is displayed, the left glass 940 of the 3D viewing device 195 is opened during the period T'4.

Accordingly, the user wearing the 3D viewing device 195 views a 3D object 1345 as a double image when viewing a 3D image 1340 during the fourth period T'4 as shown in FIG. 15B. Accordingly, the user cannot reliably (or correctly) view the 3D image.

In an embodiment of the present invention, the left and right glasses are simultaneously opened in the display period of a left-eye image or a right-eye image included in a 3D image displayed on the image display device as an exemplary method for preventing the user from seeing a double image when viewing a 3D image.

That is, the left and right glasses of the 3D viewing device 195 are simultaneously opened in synchronization with one of a left-eye image or a right-eye image of a 3D image.

The controller 920 in the 3D viewing device 195 may internally generate a synchronization signal when the period of the received synchronization signals Vsync has changed or when no synchronization signal Vsync is received as described above.

The controller 920 in the 3D viewing device 195 may control the left and right glasses of the 3D viewing device 195 to be simultaneously opened in synchronization with one of a left-eye image or a right-eye image of a 3D image based on the generated synchronization signal. This prevents the user from seeing a double image and thus to reliably view the 3D image.

Figure 17:
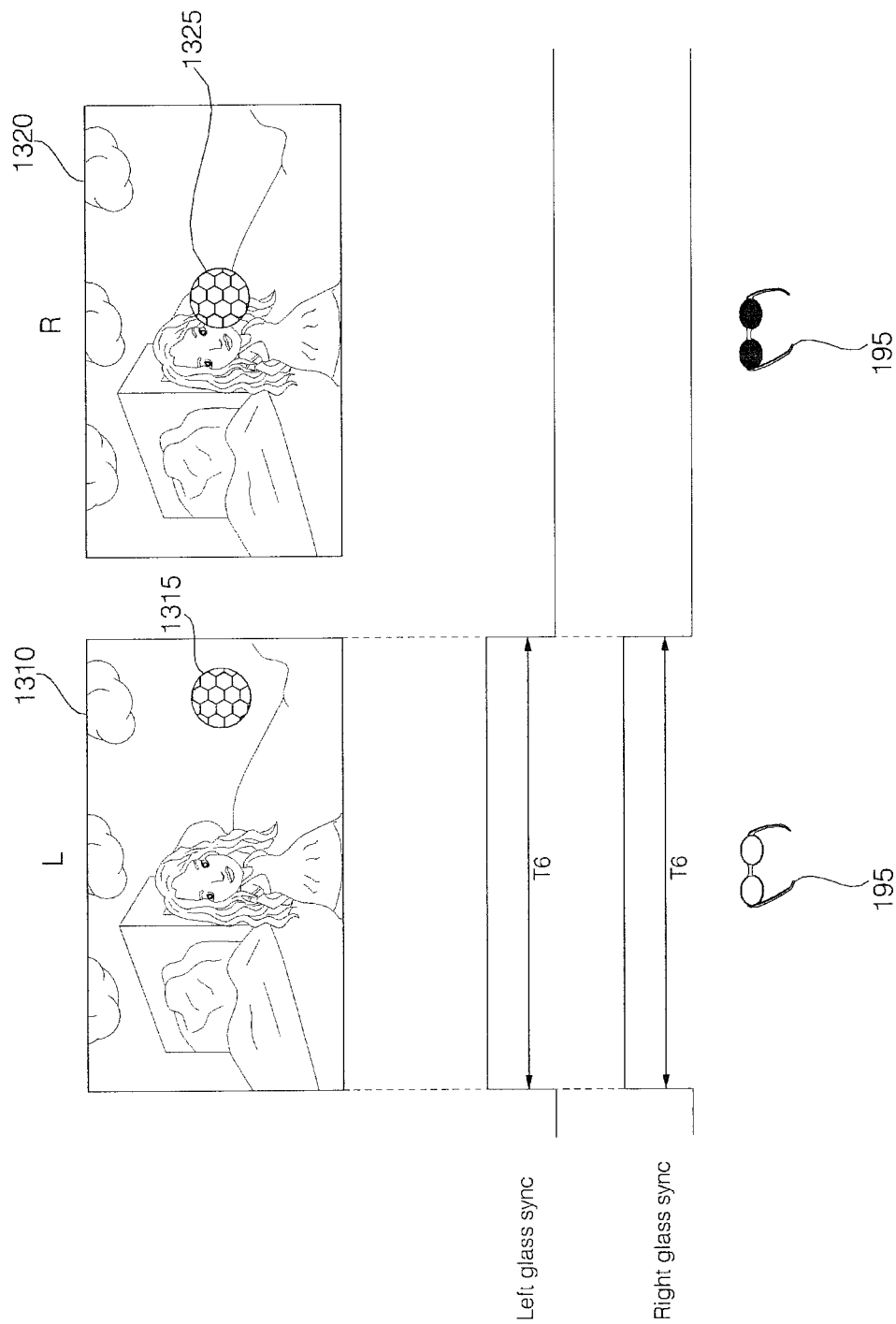
Figure 18:
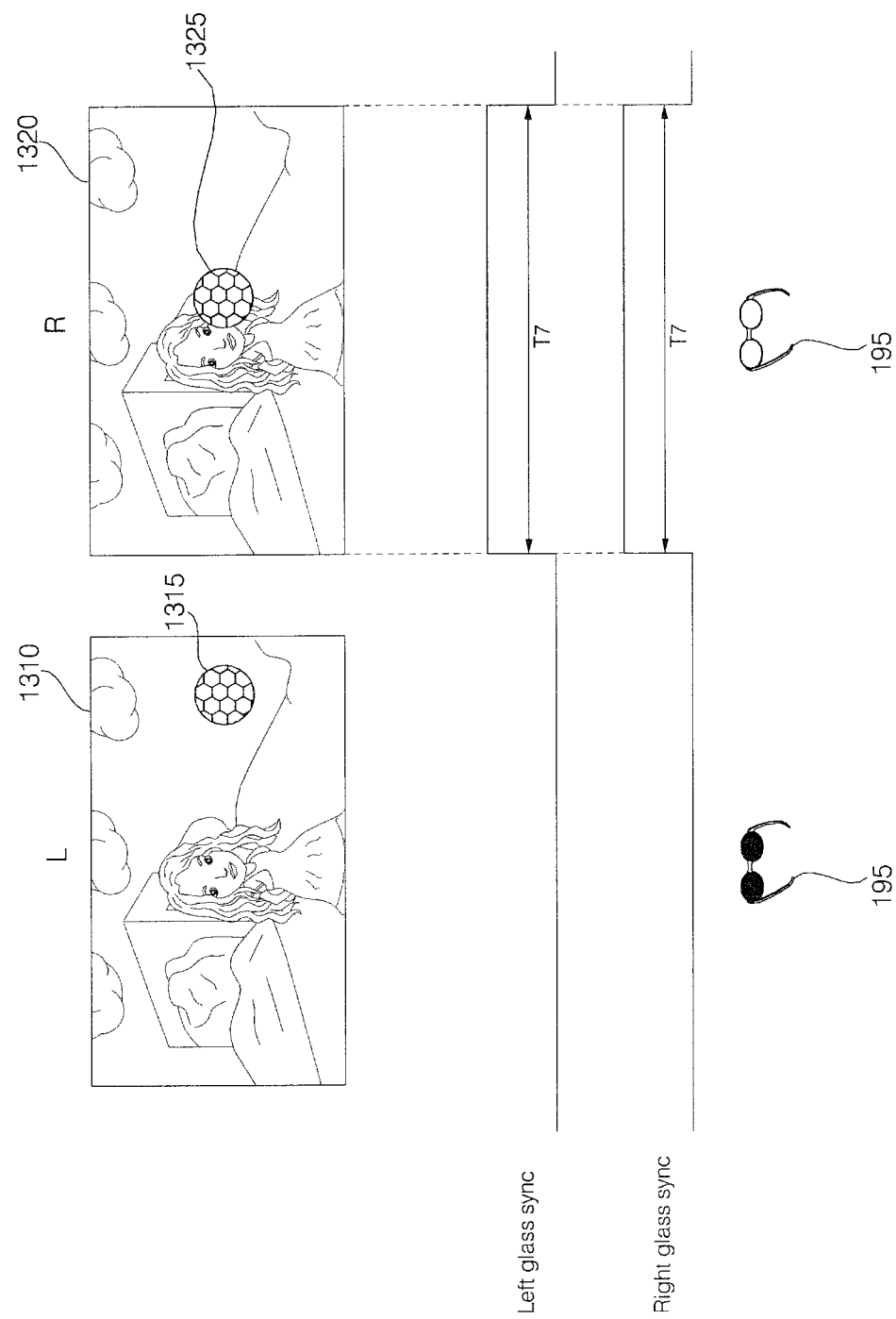

FIGS. 17 and 18 illustrate examples in which the left and right glasses are simultaneously opened in the display period of a left-eye image or a right-eye image included in a 3D image displayed on the image display device as an exemplary method for preventing the user from seeing a double image when viewing a 3D image.

First, in the example of FIG. 17, the left glass 940 and the right glass 960 of the 3D viewing device 195 are simultaneously opened in a display period T6 of a left-eye image 1310 included in a 3D image. Then, both the left glass 940 and the right glass 960 of the 3D viewing device 195 are closed in a display period of a right-eye image 1320 included in the 3D image. Accordingly, the user wearing the 3D viewing device 195 sees only the left-eye image 1310, thereby reliably viewing the corresponding 2D image.

Next, in the example of FIG. 18, the left glass 940 and the right glass 960 of the 3D viewing device 195 are simultaneously opened in a display period T7 of a right-eye image 1320 included in a 3D image. Then, both the left glass 940 and the right glass 960 of the 3D viewing device 195 are closed in a display period of a left-eye image 1310 included in the 3D image. Accordingly, the user wearing the 3D viewing device 195 sees only the right-eye image 1320, thereby reliably viewing the corresponding 2D image.

In the examples of FIGS. 17 and 18, the simultaneous opening period of the left and right glasses of the 3D viewing device 195 is the same as the alternate opening period of the left or right glass of the 3D viewing device 195 in FIG. 13A. However, the present invention is not limited to these examples.

In another example, the simultaneous opening period of the 3D viewing device 195 in FIGS. 17 and 18 is preferably shorter than the alternate opening period of the left or right glass of the 3D viewing device 195 in FIG. 13A.

This example takes into consideration the difficulty in synchronizing the period T6 of FIG. 17 or the period T7 of FIG. 18 with the display period of the left-eye image or the display period of the right-eye image. Thus, the left and right glasses can reliably be simultaneously opened in the display period of the left-eye image or the right-eye image included in the 3D image.

On the other hand, the controller 920 in the 3D viewing device 195 may control the 3D viewing device 195 to transmit an abnormal operation signal to the image display device 100 when the synchronization signal period has changed. This allows the image display device 100 to switch from 3D image display to 2D image display. This procedure will be described later with reference to FIG. 21.

Figure 19:
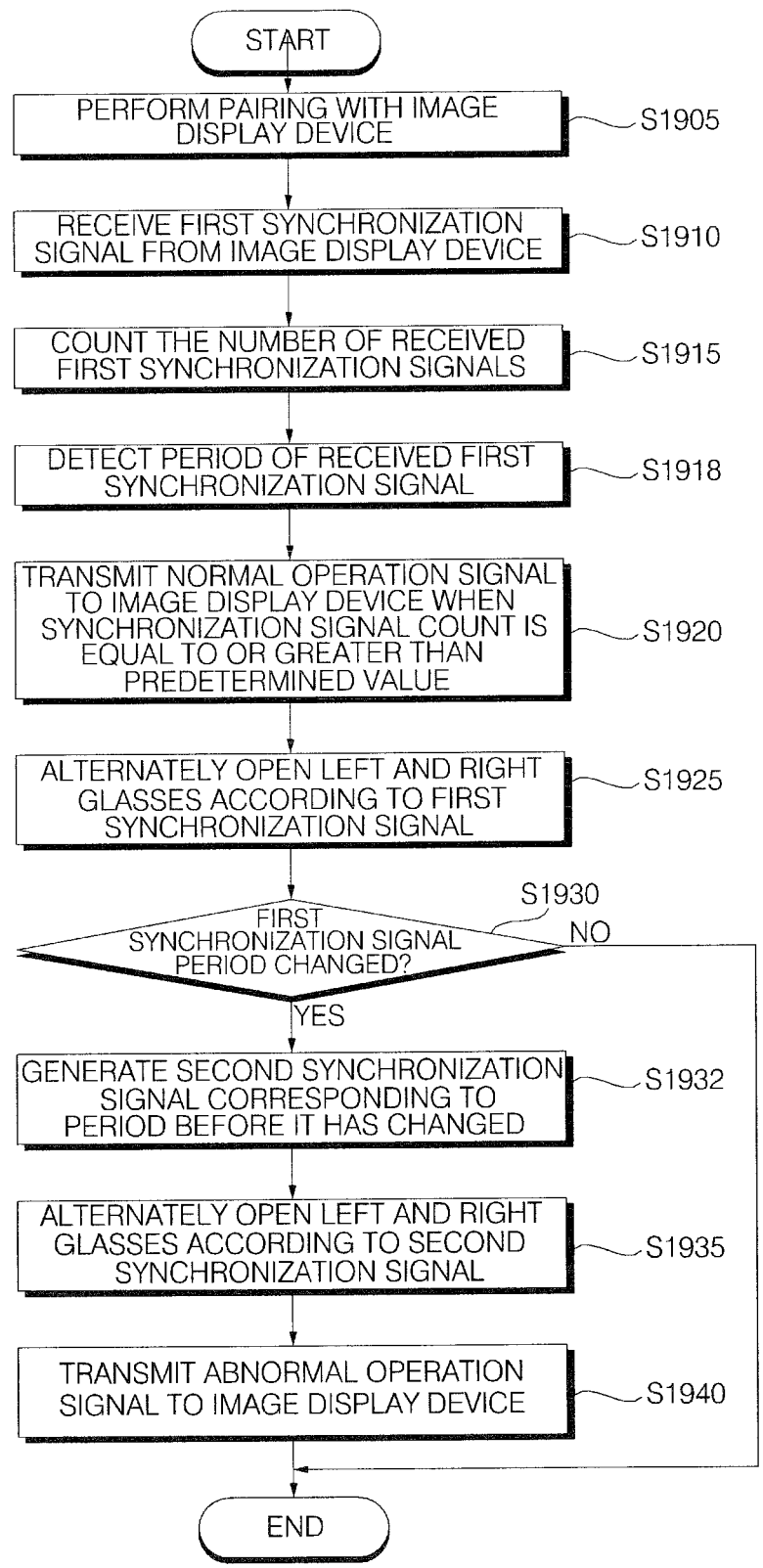
FIG. 19 is a flow chart illustrating a method for operating a 3D viewing device according to an embodiment of the present invention.
Figure 20:
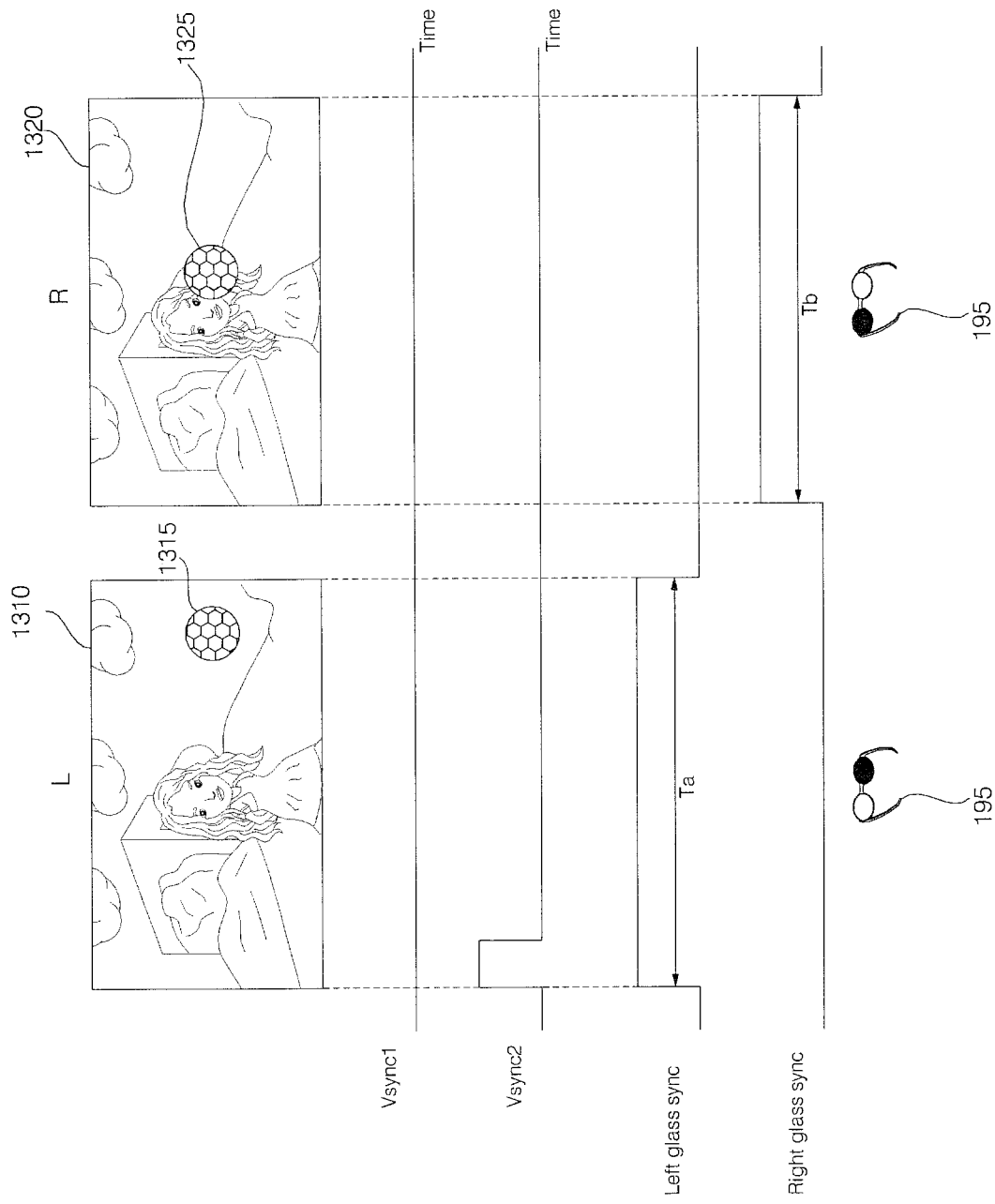
FIG. 20 illustrates various examples of the method for operating a 3D viewing device shown in FIG. 19.

FIG. 19 is a flow chart illustrating a method for operating a 3D viewing device according to an embodiment of the present invention and FIG. 20 illustrates various examples of the method for operating a 3D viewing device shown in FIG. 19.

The method for operating a 3D viewing device of FIG. 19 is similar to the method for operating a 3D viewing device of FIG. 11. Thus, the following description will focus on the differences between the methods of FIGS. 19 and 11.

Referring to FIG. 19, steps S1905 to S1925 correspond to steps S1105 to S1125 of FIG. 11.

However, unlike the method of FIG. 11, a first synchronization signal Vsync1 is received from the image display device 100 in step S1910.

In addition, unlike the method of FIG. 11, the period of the first synchronization signal Vsync1 is detected based on received first synchronization signals Vsync1 (S1918).

In step S1918, the controller 920 in the 3D viewing device 195 may detect the period of the first synchronization signal Vsync1 based on the received first synchronization signal Vsync1.

For example, the period of the first synchronization signal Vsync1 may be ⅟₆₀th of a second when the first synchronization signal Vsync1 is synchronized with one of a left-eye image and a right-eye image in a 3D image.

In the meantime, the controller 920 determines whether or not the period of the first synchronization signal has changed (S1930). Upon determining that the period of the first synchronization signal has changed, the controller 920 generates a second synchronization signal corresponding to the period prior to the change of the period (S1932). The controller 920 alternately opens the left and right glasses according to the second synchronization signal (S1935). The controller 920 then transmits an abnormal operation signal to the image display device (S1940).

Upon determining that the period of the received first synchronization signal Vsync1 has changed, the controller 920 in the 3D viewing device 195 may generate a second synchronization signal Vsync2 based on first synchronization signals Vsync1 received before the period has changed.

For example, the period of the generated second synchronization signal Vsync2 may be 1/60th of a second when the period of first synchronization signals Vsync1 received before the period has changed is 1/60th of a second. The controller 920 in the 3D viewing device 195 may control the left glass 940 and the right glass 960 of the 3D viewing device 195 to be alternately opened based on the generated second synchronization signal Vsync2.

FIG. 20 illustrates that a left-eye image 1310 including an object 1315 and a right-eye image 1320 including an object 1325 are displayed on the display for different times.

Upon determining that the 3D viewing device 195 has not received a first synchronization signal Vsync1, the controller 920 in the 3D viewing device 195 generates a second synchronization signal Vsync2.

Accordingly, the left glass 940 of the 3D viewing device 195 is opened during a first period Ta in which the left-eye image 1310 is displayed on the display 180 and the right glass 960 of the 3D viewing device 195 is opened during a second period Tb in which the right-eye image 1320 is displayed on the display 180.

This allows a user wearing the 3D viewing device 195 to view a 3D image 1330 as shown in FIG. 13B. Specifically, a 3D object 1335 may appear to protrude from the display 180 by a depth d.

On the other hand, the controller 920 in the 3D viewing device 195 may control the 3D viewing device 195 to transmit an abnormal operation signal to the image display device 100 when the synchronization signal period has changed. This allows the image display device 100 to switch from 3D image display to 2D image display. This procedure will be described later with reference to FIG. 21.

Figure 21:
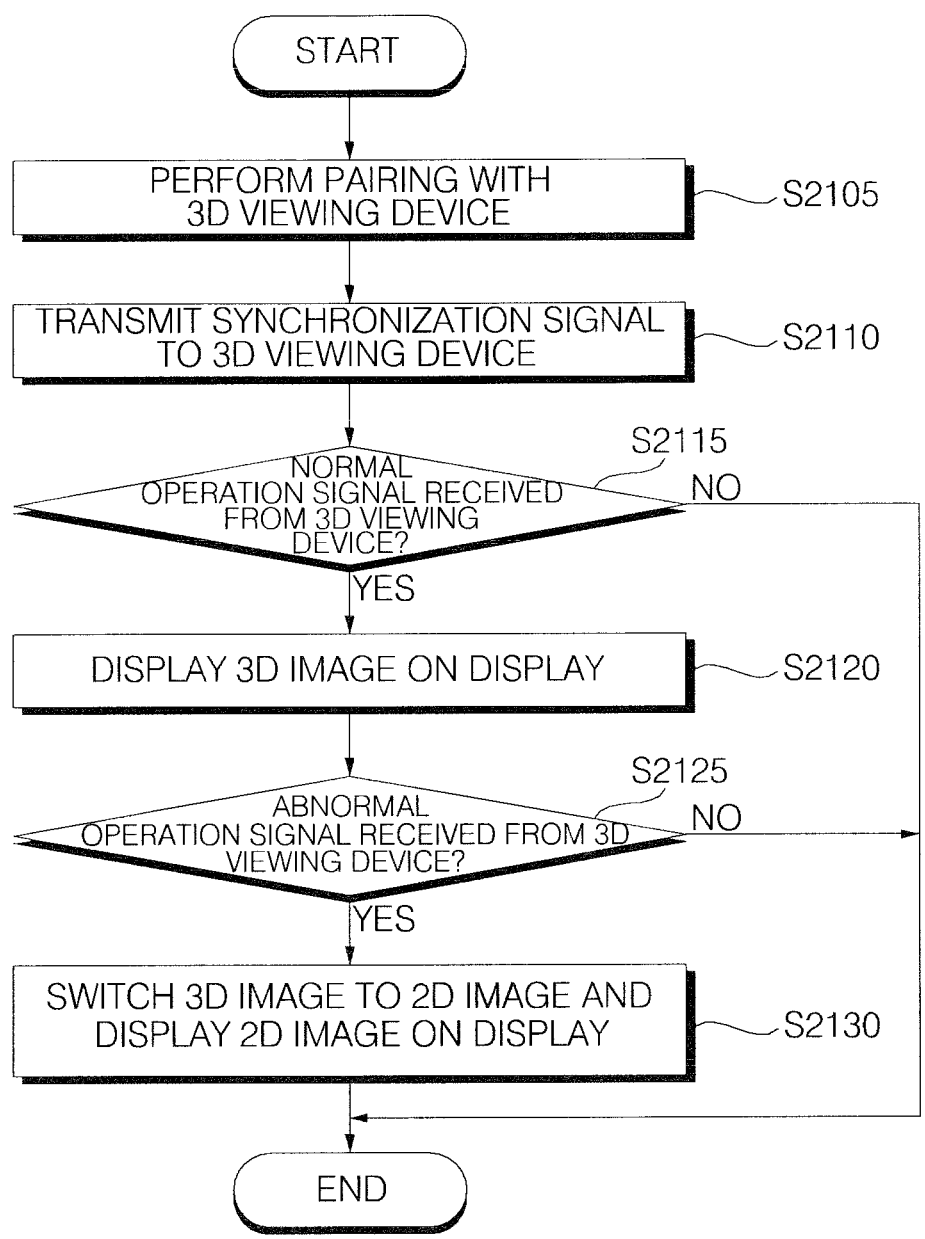
FIG. 21 is a flow chart illustrating a method for operating an image display device according to an embodiment of the present invention.
Figure 22:
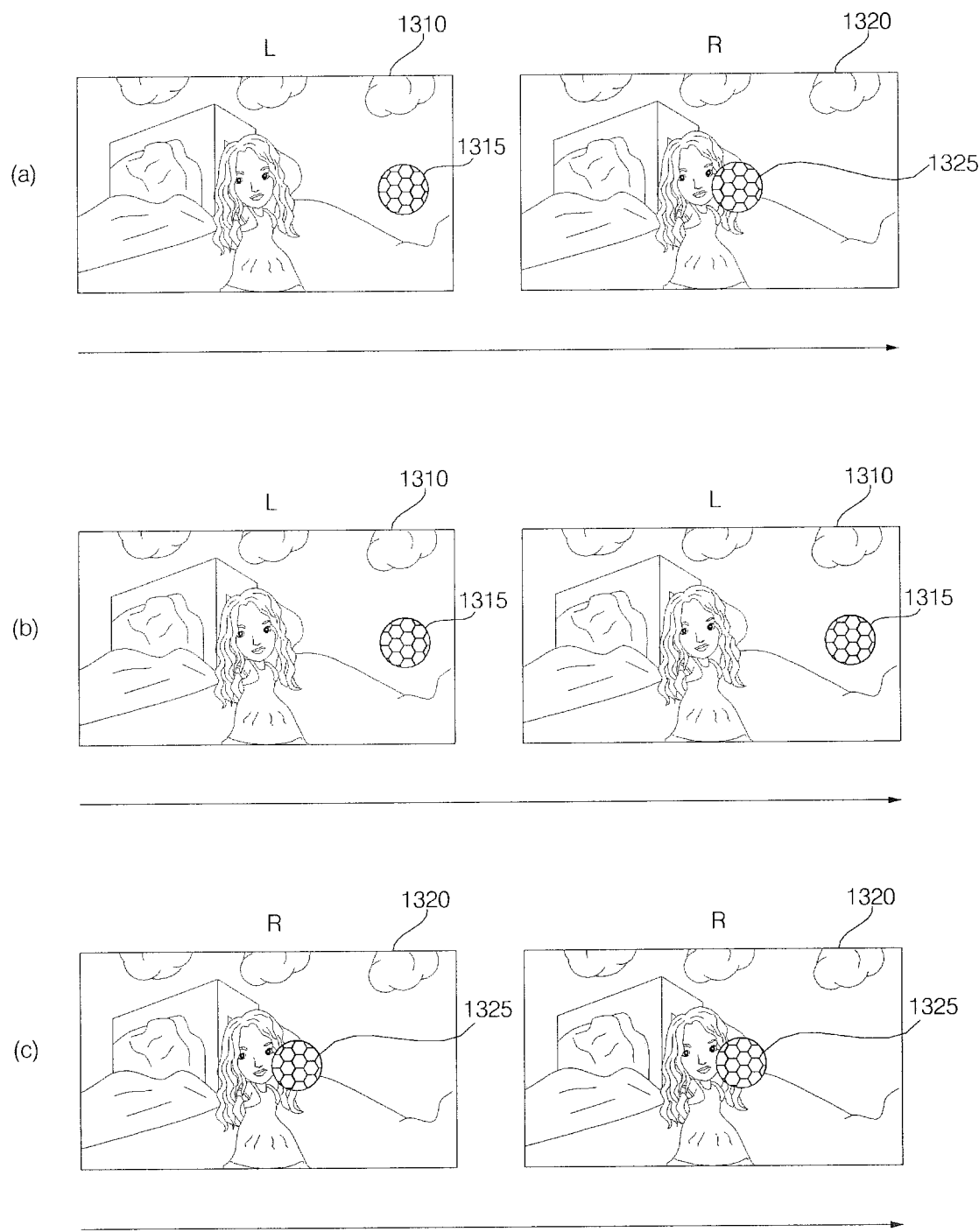
FIG. 22 illustrates various examples of the method for operating an image display device shown in FIG. 21.

FIG. 21 is a flow chart illustrating a method for operating an image display device according to an embodiment of the present invention and FIG. 22 illustrates various examples of the method for operating an image display device shown in FIG. 21.

Referring to FIG. 21, first, the image display device 100 performs pairing with the 3D viewing device 195 (S2105). The image display device 100 then transmits a synchronization signal to the 3D viewing device 195 (S2110).

For example, the image display device 100 may perform pairing with the 3D viewing device 195 when the 3D viewing device 195 is turned on through operation of the switch 918 as described above. Alternatively, the image display device 100 may perform pairing with the 3D viewing device 195 when the image display device 100 displays a 3D image or will soon display a 3D image.

The image display device 100 may transmit a pairing signal to the 3D viewing device 195 to perform pairing with the 3D viewing device 195 and the 3D viewing device 195 may transmit a response signal to the image display device 100.

When pairing is completed, the image display device 100 may transmit a synchronization signal Vsync to the 3D viewing device 195. The synchronization signal Vsync may be used to open and close the left glass 940 and the right glass 960 of the 3D viewing device 195.

The image display device 100 then determines whether or not a normal operation signal has been received from the 3D viewing device 195 (S2115). Upon determining that a normal operation signal has been received from the 3D viewing device 195, the image display device 100 displays a 3D image on the display (S2120).

The controller 170 in the image display device 100 may determine whether or not a normal operation signal has been received from the 3D viewing device 195. For example, as described above in step S1120 of FIG. 11, when the 3D viewing device 195 has transmitted a normal operation signal, the controller 170 may determine that the 3D viewing device 195 is in normal operation based on the normal operation signal.

Accordingly, the controller 170 controls the display 180 to display an input or stored 3D image.

FIG. 22A illustrates that a left-eye image 1310 including an object 1315 and a right-eye image 1320 including an object 1325 are sequentially displayed in response to reception of a normal operation signal. This allows the viewer wearing the 3D viewing device 195 to view a 3D image as shown in FIG. 13B.

The image display device 100 determines whether or not an abnormal operation signal has been received from the 3D viewing device 195 (S2125). Upon determining that an abnormal operation signal has been received from the 3D viewing device 195, the image display device 100 switches the 3D image to a 2D image and displays the 2D image on the display (S2130).

The controller 170 in the image display device 100 may determine whether or not an abnormal operation signal has been received from the 3D viewing device 195. For example, as described above in step S1140 of FIG. 11 or in step S1940 of FIG. 19, when the 3D viewing device 195 has transmitted an abnormal operation signal, the controller 170 may determine that the 3D viewing device 195 is in abnormal operation based on the abnormal operation signal.

Accordingly, the controller 170 switches the 3D image displayed on the display 180 to a 2D image and displays the 2D image on the display.

FIG. 22B illustrates that the left-eye image 1310 including the object 1315 continues to be displayed since an abnormal operation signal has been received. This allows the viewer wearing the 3D viewing device 195 to reliably view a 2D image corresponding to the left-eye image 1310.

FIG. 22C illustrates that the right-eye image 1320 including the object 1325 continues to be displayed since an abnormal operation signal has been received. This allows the viewer wearing the 3D viewing device 195 to reliably (or correctly) view a 2D image corresponding to the right-eye image 1320.

As is apparent from the above description, the image display device, the 3D viewing device, and the method for operating the same according to the present invention have a variety of advantages.

For example, when a period of synchronization signals received from the image display device has changed, such change is detected and the left glass and the right glass of the 3D viewing device are simultaneously opened in a left-eye image display period or a right-eye image display period of a 3D image. This allows a user to reliably (or correctly) view a 3D image using the 3D viewing device even during in the event of an abnormal operation.

Here, an opening period of the left glass and the right glass in which the left glass and the right glass are simultaneously opened may be set to be shorter than an opening period of the left glass and the right glass in which the left glass and the right glass are alternately opened. This allows the user to view only one of the left-eye and right-eye images, thereby preventing viewing of a double image.

On the other hand, when a period of first synchronization signals received from the image display device has changed, such change is detected, a second synchronization signal corresponding to a period prior to the change of the period of the first synchronization signal is generated, and the left glass and the right glass are alternately opened according to the second synchronization signal. This allows a user to reliably view a 3D image using the 3D viewing device even during in the event of an abnormal operation.

When a normal operation signal is received from the 3D viewing device, the image display device displays a 3D image, and, when an abnormal operation signal is received from the 3D viewing device, the image display device changes the 3D image to a 2D image and displays the 3D image, thereby allowing the user to reliably view the image.

The image display device and the method for operating the same according to the present invention are not limited in application to the configurations and methods of the embodiments described above and all or some of the embodiments may be selectively combined to implement various modifications.

The method for operating an image display device according to the present invention can be embodied as processor readable code on a processor readable medium provided in the mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for operating a three-dimensional (3D) viewing device, the method comprising:
    activating the 3D viewing device when a switch in the 3D viewing device is turned on;
    transmitting a pairing signal to an image display device after activating the 3D viewing device;
    receiving a synchronization signal from the image display device after pairing between the 3D viewing device and the image display device is completed;
    alternately opening a left glass and a right glass according to the synchronization signal during an image display period of a 3D image displayed on the image display device;
    determining a synchronization signal period at intervals of the received synchronization signal;
    simultaneously opening the left glass and the right glass in one of a left-eye image display period and a right-eye image display period of the 3D image displayed on the image display device and simultaneously closing the left glass and the right glass in the other one of the left-eye image display period and the right-eye image display period when the synchronization signal period is out of a predetermined range; and
    simultaneously opening the left glass and the right glass during an image display period of a two-dimensional (2D) image displayed on the image display device,
    wherein an opening period of the left glass and the right glass at the simultaneous opening of the left glass and the right glass is shorter than an opening period of the left glass and the right glass at the alternately opening of the left glass and the right glass.

2. The method according to claim 1, further comprising:
    counting a number of received synchronization signals; and
    transmitting a normal operation signal to the image display device when the counted number is equal to or greater than a predetermined value,
    wherein the alternately opening and the simultaneous opening are performed when the 3D image is displayed on the image display device.

3. The method according to claim 1, further comprising transmitting an abnormal operation signal to the image display device when the synchronization signal period is out of a predetermined range.

4. A three-dimensional (3D) viewing device comprising:
    a left glass and a right glass;
    a switch;
    a power supply unit to be activated to supply power to each component in the 3D viewing device when the switch in the 3D viewing device is turned on;
    a wireless communication unit to transmit a pairing signal to an image display device after the 3D viewing device is activated and to receive a synchronization signal from an image display device after pairing between the 3D viewing device and the image display device is completed; and
    a controller to perform a control operation for alternately opening the left glass and the right glass according to a synchronization signal received from the image display device through the wireless communication unit during an image display period of a 3D image displayed on the image display device, and the controller simultaneously opening the left glass and the right glass in one of a left-eye image display period and a right-eye image display period of the 3D image displayed on the image display device, and the controller determining a synchronization signal period at intervals of the received synchronization signal, and the controller simultaneously closing the left glass and the right glass in the other one of the left-eye image display period and the right-eye image display period when the synchronization signal period is out of a predetermined range, and the controller simultaneously opening the left glass and the right glass during an image display period of a two-dimensional (2D) image displayed on the image display device, wherein the controller performs setting such that an opening period of the left glass and the right glass in which the left glass and the right glass are simultaneously opened is shorter than an opening period of the left glass and the right glass in which the left glass and the right glass are alternately opened.

5. The 3D viewing device according to claim 4, wherein the controller performs a control operation for counting a number of received synchronization signals and transmitting a normal operation signal to the image display device when the counted number is equal to or greater than a predetermined value.

6. The 3D viewing device according to claim 4, wherein the controller performs a control operation for transmitting an abnormal operation signal to the image display device when the synchronization signal period is out of a predetermined range.

7. The method according to claim 1, further comprising transmitting, to the image display device, a signal indicating whether or not the 3D viewing device is being used.

8. The 3D viewing device according to claim 4, wherein the wireless communication unit further transmits, to the image display device, a signal indicating whether or not the 3D viewing device is being used.

* * * * *